United States Patent
Zhou et al.

(10) Patent No.: US 10,737,220 B2
(45) Date of Patent: Aug. 11, 2020

(54) PVP- AND/OR PVL-CONTAINING COMPOSITE MEMBRANES AND METHODS OF USE

(71) Applicant: 3M INNOVATIVE PROPERTIES COMPANY, St. Paul, MN (US)

(72) Inventors: Jinsheng Zhou, Woodbury, MN (US); Kazuhiko Mizuno, Tokyo (JP); Moses M. David, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/737,843

(22) PCT Filed: Jul. 1, 2016

(86) PCT No.: PCT/US2016/040650
§ 371 (c)(1),
(2) Date: Dec. 19, 2017

(87) PCT Pub. No.: WO2017/004492
PCT Pub. Date: Jan. 5, 2017

(65) Prior Publication Data
US 2019/0001273 A1     Jan. 3, 2019

Related U.S. Application Data

(60) Provisional application No. 62/187,497, filed on Jul. 1, 2015.

(51) Int. Cl.
*B01D 61/36* (2006.01)
*B01D 67/00* (2006.01)
(Continued)

(52) U.S. Cl.
CPC ....... *B01D 61/362* (2013.01); *B01D 67/0006* (2013.01); *B01D 67/0088* (2013.01);
(Continued)

(58) Field of Classification Search
None
See application file for complete search history.

(56) References Cited

U.S. PATENT DOCUMENTS

| | | |
|---|---|---|
| 2,930,754 A | 3/1960 | Stuckey |
| 2,958,656 A | 11/1960 | Stuckey |

(Continued)

FOREIGN PATENT DOCUMENTS

| | | |
|---|---|---|
| CA | 2020696 | 2/1991 |
| CA | 2000281 | 4/1991 |

(Continued)

OTHER PUBLICATIONS

Billard, "Diffusion of Organic Compounds Through Chemically Asymmetric Membranes Made of Semi-Interpenetrating Polymer Networks", Separation and Purification Technology, 1998, vol. 14, pp. 221-232.

(Continued)

*Primary Examiner* — Ana M Fortuna
(74) *Attorney, Agent, or Firm* — Harold C. Knecht, III

(57) ABSTRACT

A composite membrane for selectively pervaporating a first liquid from a mixture comprising the first liquid and a second liquid. The composite membrane includes a porous substrate comprising opposite first and second major surfaces, and a plurality of pores. A pore-filling polymer is disposed in at least some of the pores so as to form a layer having a thickness within the porous substrate. The polymer is more permeable to the first liquid than the second liquid but not soluble in the first liquid or the second liquid. The composite membrane may be asymmetric or symmetric with respect to the amount of pore-filling polymer throughout the thickness of the porous substrate.

20 Claims, 4 Drawing Sheets

(51) Int. Cl.
   *B01D 69/10* (2006.01)
   *B01D 69/12* (2006.01)
   *B01D 71/44* (2006.01)
   *B01D 71/78* (2006.01)
   *F02M 37/30* (2019.01)
   *B01D 69/02* (2006.01)
   *C10L 1/06* (2006.01)
   *F02D 19/06* (2006.01)

(52) U.S. Cl.
   CPC ......... *B01D 67/0093* (2013.01); *B01D 69/02* (2013.01); *B01D 69/10* (2013.01); *B01D 69/12* (2013.01); *B01D 69/125* (2013.01); *B01D 71/44* (2013.01); *B01D 71/78* (2013.01); *C10L 1/06* (2013.01); *F02M 37/30* (2019.01); *B01D 2323/286* (2013.01); *B01D 2323/30* (2013.01); *B01D 2323/345* (2013.01); *B01D 2323/40* (2013.01); *B01D 2323/46* (2013.01); *B01D 2325/022* (2013.01); *C10L 2270/023* (2013.01); *C10L 2290/548* (2013.01); *F02D 19/0671* (2013.01); *Y02T 10/36* (2013.01)

(56) References Cited

U.S. PATENT DOCUMENTS

| | | |
|---|---|---|
| 3,370,102 A | 2/1968 | Carpenter |
| 4,031,864 A | 6/1977 | Crothers |
| 4,115,465 A | 9/1978 | Elfert |
| 4,277,344 A | 7/1981 | Cadotte |
| 4,366,307 A | 12/1982 | Singh |
| 4,464,494 A | 8/1984 | King |
| 4,581,043 A | 4/1986 | Scheer |
| 4,582,726 A | 4/1986 | Shuey |
| 4,778,851 A | 10/1988 | Henton |
| 4,789,480 A | 12/1988 | Bruschke |
| 4,798,764 A | 1/1989 | Tressler |
| 4,802,987 A | 2/1989 | Black |
| 4,828,773 A | 5/1989 | Feimer |
| 4,846,977 A | 7/1989 | DeVellis |
| 4,861,628 A | 8/1989 | Schucker |
| 4,879,044 A | 11/1989 | Feimer |
| 4,885,096 A | 12/1989 | Black |
| 4,914,064 A | 4/1990 | Schucker |
| 4,929,357 A | 5/1990 | Schucker |
| 4,929,358 A | 5/1990 | Koenitzer |
| 4,944,880 A | 7/1990 | Ho |
| 4,946,594 A | 8/1990 | Thaler |
| 4,962,271 A | 10/1990 | Black |
| 4,968,430 A | 11/1990 | Hildenbrand |
| 4,976,868 A | 12/1990 | Sartori |
| 4,990,275 A | 2/1991 | Ho |
| 4,997,906 A | 3/1991 | Thaler |
| 5,012,035 A | 4/1991 | Sartori |
| 5,012,036 A | 4/1991 | Sartori |
| 5,019,666 A | 5/1991 | Sartori |
| 5,028,685 A | 7/1991 | Ho |
| 5,030,355 A | 7/1991 | Schucker |
| 5,039,417 A | 8/1991 | Schucker |
| 5,039,418 A | 8/1991 | Schucker |
| 5,039,422 A | 8/1991 | Schucker |
| 5,045,354 A | 9/1991 | Feimer |
| 5,049,281 A | 9/1991 | Schucker |
| 5,055,631 A | 10/1991 | Sartori |
| 5,055,632 A | 10/1991 | Schucker |
| 5,063,186 A | 11/1991 | Schucker |
| 5,069,793 A | 12/1991 | Kaschemekat |
| 5,075,006 A | 12/1991 | Schucker |
| 5,093,003 A | 3/1992 | Ho |
| 5,095,171 A | 3/1992 | Feimer |
| 5,096,592 A | 3/1992 | Schucker |
| 5,098,570 A | 3/1992 | Schucker |
| 5,108,549 A | 4/1992 | Wenzlaff |
| 5,128,439 A | 7/1992 | Sartori |
| 5,130,017 A | 7/1992 | Schucker |
| 5,138,023 A | 8/1992 | Sartori |
| 5,159,130 A | 10/1992 | Satori |
| 5,180,496 A | 1/1993 | Sartori |
| 5,221,481 A | 6/1993 | Schucker |
| 5,241,039 A | 8/1993 | Ho |
| 5,254,795 A | 10/1993 | Boucher |
| 5,256,503 A | 10/1993 | Cook |
| 5,275,726 A | 1/1994 | Feimer |
| 5,290,452 A | 3/1994 | Schucker |
| 5,350,519 A | 9/1994 | Kaschemekat |
| 5,396,019 A | 3/1995 | Sartori |
| 5,425,865 A | 6/1995 | Singleton |
| 5,468,390 A | 11/1995 | Crivello |
| 5,498,823 A | 3/1996 | Noble |
| 5,547,551 A | 8/1996 | Bahar |
| 5,550,199 A | 8/1996 | Ho |
| 5,559,254 A | 9/1996 | Krug |
| 5,582,735 A | 12/1996 | Mancusi, III |
| 5,611,930 A | 3/1997 | Nguyen |
| 5,643,442 A | 7/1997 | Sweet |
| 5,670,052 A | 9/1997 | Ho |
| 5,700,374 A | 12/1997 | Steinhauser |
| 5,905,182 A | 5/1999 | Streicher |
| 5,914,435 A | 6/1999 | Streicher |
| 6,068,771 A | 5/2000 | McDermott |
| 6,156,950 A | 12/2000 | Ragil |
| 6,273,937 B1 | 8/2001 | Schucker |
| 6,423,784 B1 | 7/2002 | Hamrock |
| 6,586,133 B1 | 7/2003 | Teeters |
| 6,620,958 B2 | 9/2003 | Buchanan |
| 6,622,663 B2 | 9/2003 | Weissman |
| 6,702,945 B2 | 3/2004 | Saxton |
| 6,800,371 B2 | 10/2004 | Gross |
| 6,896,717 B2 | 5/2005 | Pinnau |
| 6,972,093 B2 | 12/2005 | Partridge |
| 7,029,574 B2 | 4/2006 | Yang |
| 7,053,256 B2 | 5/2006 | Yang |
| 7,148,389 B2 | 12/2006 | Yang |
| 7,247,370 B2 | 7/2007 | Childs |
| 7,303,675 B2 | 12/2007 | De La Cruz |
| 7,314,565 B2 | 1/2008 | Sabottke |
| 7,320,297 B2 | 1/2008 | Kamio |
| 7,337,754 B2 | 3/2008 | Dearth |
| 7,348,088 B2 | 3/2008 | Hamrock |
| 7,370,609 B2 | 5/2008 | Kamio |
| 7,426,907 B2 | 9/2008 | Dearth |
| 7,604,746 B2 | 10/2009 | Childs |
| 7,638,053 B2 | 12/2009 | Yeager |
| 7,642,393 B2 | 1/2010 | Wang |
| 7,645,840 B2 | 1/2010 | Zook |
| 7,647,899 B2 | 1/2010 | Dearth |
| 7,708,151 B2 | 5/2010 | Peiffer |
| 7,785,471 B2 | 8/2010 | Sabottke |
| 7,803,275 B2 | 9/2010 | Partridge |
| 7,842,124 B2 | 11/2010 | Partridge |
| 7,919,141 B2 | 4/2011 | Tanioka |
| 8,051,828 B2 | 11/2011 | Sengupta |
| 8,056,732 B2 | 11/2011 | McKeown |
| 8,083,946 B2 | 12/2011 | Sabottke |
| 8,118,009 B2 | 2/2012 | Pursifull |
| 8,119,006 B2 | 2/2012 | Patil |
| 8,231,013 B2 | 7/2012 | Chu |
| 8,258,363 B2 | 9/2012 | Kalakkunnath |
| 8,454,832 B2 | 6/2013 | Hamad |
| 8,550,058 B2 | 10/2013 | Pursifull |
| 8,562,825 B2 | 10/2013 | Partridge |
| 8,580,111 B2 | 11/2013 | Partridge |
| 8,597,518 B2 | 12/2013 | Parnas |
| 8,729,197 B2 | 5/2014 | Kropp |
| 8,741,445 B2 | 6/2014 | Bannai |
| 8,765,824 B2 | 7/2014 | Shaffer |
| 8,827,086 B2 | 9/2014 | Ansorge |
| 9,056,283 B2 | 6/2015 | Yahaya |
| 9,303,222 B2 | 4/2016 | Keuken |
| 2002/0139321 A1 | 10/2002 | Weissman |
| 2002/0144944 A1 | 10/2002 | Arcella |
| 2002/0161066 A1 | 10/2002 | Remigy |

(56) References Cited

U.S. PATENT DOCUMENTS

| | | |
|---|---|---|
| 2003/0134515 A1 | 7/2003 | David |
| 2003/0163013 A1 | 8/2003 | Yang |
| 2004/0000231 A1 | 1/2004 | Bikson |
| 2004/0024123 A1 | 2/2004 | Moya |
| 2004/0026321 A1 | 2/2004 | Minhas |
| 2004/0040891 A1 | 3/2004 | Yang |
| 2004/0044262 A1 | 3/2004 | Yang |
| 2004/0121210 A1 | 6/2004 | Hamrock |
| 2004/0144723 A1 | 7/2004 | Gloeckle |
| 2004/0149644 A1 | 8/2004 | Partridge |
| 2005/0103715 A1 | 5/2005 | Sabottke |
| 2005/0119517 A1 | 6/2005 | Millington |
| 2006/0000778 A1 | 1/2006 | Childs |
| 2006/0289352 A1 | 12/2006 | Yeager |
| 2007/0034192 A1 | 2/2007 | Kamio |
| 2007/0128425 A1 | 6/2007 | Hadj Romdhane |
| 2007/0221163 A1 | 9/2007 | Kamio |
| 2007/0234976 A1 | 10/2007 | Dearth |
| 2007/0272613 A1 | 11/2007 | Minhas |
| 2008/0011680 A1 | 1/2008 | Partridge |
| 2008/0035557 A1 | 2/2008 | Partridge |
| 2008/0035566 A1 | 2/2008 | Sabottke |
| 2008/0035572 A1 | 2/2008 | Sabottke |
| 2008/0035573 A1 | 2/2008 | Peiffer |
| 2008/0035575 A1 | 2/2008 | Partridge |
| 2008/0086021 A1 | 4/2008 | Wang |
| 2008/0200696 A1 | 8/2008 | Miller |
| 2008/0216649 A1* | 9/2008 | Huang ................ B01D 53/228 95/50 |
| 2008/0223785 A1 | 9/2008 | Miller |
| 2009/0026130 A1 | 1/2009 | Chikura |
| 2009/0157277 A1 | 6/2009 | Pursifull |
| 2009/0159057 A1 | 6/2009 | Pursifull |
| 2009/0242038 A1 | 10/2009 | Sengupta |
| 2009/0247805 A1 | 10/2009 | Bournay |
| 2009/0277837 A1 | 11/2009 | Liu |
| 2010/0018926 A1 | 1/2010 | Liu |
| 2010/0059441 A1 | 3/2010 | Pattil |
| 2010/0075101 A1 | 3/2010 | Tang |
| 2010/0108605 A1 | 5/2010 | Patil |
| 2010/0226823 A1 | 9/2010 | Rakhman |
| 2010/0325945 A1 | 12/2010 | Keuken |
| 2011/0091698 A1 | 4/2011 | Zhou |
| 2012/0074043 A1 | 3/2012 | Kalakkunnath |
| 2012/0132576 A1 | 5/2012 | Partridge |
| 2012/0132577 A1 | 5/2012 | Partridge |
| 2012/0132589 A1 | 5/2012 | Hamad |
| 2012/0186446 A1 | 7/2012 | Bara |
| 2012/0190091 A1* | 7/2012 | Huang ................ B01D 53/228 435/161 |
| 2012/0266222 A1* | 10/2012 | Klatsky ................ H04L 9/3226 726/7 |
| 2012/0270958 A1 | 10/2012 | Shaffer |
| 2013/0000181 A1 | 1/2013 | Janssens |
| 2013/0029249 A1 | 1/2013 | Hamrock |
| 2013/0043186 A1 | 2/2013 | Arakai |
| 2013/0098829 A1 | 4/2013 | Dontula |
| 2013/0101797 A1 | 4/2013 | Dontula |
| 2013/0118983 A1 | 5/2013 | Livingston |
| 2013/0125816 A1 | 5/2013 | David |
| 2013/0134515 A1 | 5/2013 | Zhou |
| 2013/0184503 A1 | 7/2013 | Frania |
| 2013/0228515 A1 | 9/2013 | Yahaya |
| 2013/0323383 A1* | 12/2013 | Nazir ....................... A23L 2/74 426/442 |
| 2014/0142363 A1 | 5/2014 | Partridge |
| 2015/0353853 A1 | 12/2015 | Iwashita |
| 2016/0204409 A1* | 7/2016 | Jeon .................... H01M 2/1686 429/145 |

FOREIGN PATENT DOCUMENTS

| | | |
|---|---|---|
| CN | 101121101 | 6/2010 |
| CN | 202150515 | 2/2012 |
| CN | 102688708 | 1/2014 |
| CN | 104117290 | 4/2016 |
| CN | 105289340 | 10/2017 |
| DE | 3927787 | 2/1991 |
| DE | 10326354 | 1/2005 |
| DE | 102007049203 | 4/2009 |
| EP | 0312375 | 4/1989 |
| EP | 0312376 | 4/1989 |
| EP | 0254359 | 9/1991 |
| EP | 0326076 | 7/1994 |
| EP | 0649676 | 4/1995 |
| EP | 0526203 | 6/1995 |
| EP | 0760250 | 3/1997 |
| EP | 0760251 | 3/1997 |
| EP | 0760252 | 3/1997 |
| EP | 0811420 | 1/2004 |
| EP | 1372822 | 5/2006 |
| EP | 2041048 | 5/2011 |
| EP | 1637214 | 12/2013 |
| FR | 2937468 | 4/2010 |
| JP | S59-068535 | 4/1984 |
| JP | S59-206006 | 11/1984 |
| JP | S60-255106 | 12/1985 |
| JP | S61-257205 | 11/1986 |
| JP | H02-138136 | 5/1990 |
| JP | H07-088343 | 4/1995 |
| JP | H10-314551 | 12/1998 |
| JP | 2000-157843 | 6/2000 |
| JP | 2001-038156 | 2/2001 |
| JP | 3161562 | 4/2001 |
| JP | 3872605 | 1/2007 |
| JP | 2010-001755 | 1/2010 |
| JP | 2011-026552 | 2/2011 |
| JP | 4900328 | 3/2012 |
| KR | 20120000853 | 1/2012 |
| KR | 2015-0100029 | 9/2015 |
| KR | 10-1568119 | 11/2015 |
| RU | 2129910 | 5/1999 |
| WO | WO 97-017129 | 5/1997 |
| WO | WO 2003-008078 | 1/2003 |
| WO | WO 2005-102503 | 11/2005 |
| WO | WO 2009-006307 | 1/2009 |
| WO | WO 2009-094996 | 8/2009 |
| WO | WO 2010-002501 | 1/2010 |
| WO | WO 2010-101293 | 9/2010 |
| WO | WO 2011-018919 | 2/2011 |
| WO | WO 2012-021258 | 2/2012 |
| WO | WO 2012-038110 | 3/2012 |
| WO | WO 2013-010860 | 1/2013 |
| WO | WO 2013-151835 | 10/2013 |
| WO | WO 2014-113020 | 7/2014 |
| WO | WO 2015-103063 | 7/2015 |
| WO | WO 2017-004495 | 1/2017 |
| WO | WO 2017-004496 | 1/2017 |

OTHER PUBLICATIONS

Brun, "Separation of Hydrocarbon Mixtures by Pervaporation Through Rubbers", Membranes and Membrane Processes, Jan. 1986, pp. 335-341.
Cabasso, "Organic Liquid Mixtures Separation by Permselective Polymer Membranes. 1. Selection and Characteristics of Dense Isotropic Membranes Employed in the Pervaporation Process", Industrial & Engineering Chemistry Product Research and Development, 1983, vol. 22, No. 2, pp. 313-319.
Chang, "Octane-on-Demand as an Enable for Highly Efficient Spark Ignition Engines and Greenhouse Gas Emissions Improvement", SAE Technical Paper 2015-01-1264, Apr. 2015, 17 pages.
Childs, "Nanofiltration Using Pore-Filled Membranes: Effect of Polyelectrolyte Composition on Performance", Separation and Purification Technology, Mar. 2001, vol. 22-23, pp. 507-517.
Chishima, "Study of Ethanol-Gasoline Onboard Separation System for Knocking Suppression", Japan Society of Automotive Engineers (JASE) Technical Paper 20159380, Sep. 2015, 8 pages.
Chu, "Preparation of Thermo-Responsive Core-Shell Microcapsules with a Porous Membrane and Poly(N-Isopropylacrylamide) Gates", Journal of Membrane Science, Oct. 2001, vol. 192, No. 1-2, pp. 27-39.

(56) References Cited

OTHER PUBLICATIONS

Cunha, "Removal of Aromatics from Multicomponent Organic Mixtures by Pervaporation Using Polyurethane Membranes: Experimental and Modelling", Journal of Membrane Science, 2002, vol. 206, pp. 277-290.
Dutta, "Separation of Azeotropic Organic Liquid Mixtures by Pervaporation", American Institute of Chemical Engineers (AIChE) Journal, Apr. 1991, vol. 37, No. 4, pp. 581-588.
Fang, "Pervaporation Properties of Ethynyl-Containing Copolyimide Membranes to Aromatic/Non-Aromatic Hydrocarbon Mixtures", Polymer, 1999, vol. 40, pp. 3051-3059.
Frahn, "Generation of a Selective Layer on Polyacrylonitrile Membrane Supports for Separation of Aromatic/Non-Aromatic Hydrocarbon Mixtures by Pervaporation", Macromolecular Symposia, Feb. 2001, vol. 164, No. 1, pp. 269-276.
Frahn, "Photo-Initiated Generation of a Selective Layer on Polyacrylontrile (PAN) Composite Membranes", Journal of Materials Processing Technology, Dec. 2003, vol. 143-144, pp. 277-280.
Frahn, "Separation of Aromatic/Aliphatic Hydrocarbons by Photo-Modified Poly(Acrylonitrile) Membranes", Journal of Membrane Science, May 2004, vol. 234, Nos. 1-2, pp. 55-65.
Garcia-Aleman, "Experimental Analysis, Modeling, and Theoretical Design of McMaster Pore-Filled Nanofiltration Membranes", Journal of Membrane Science, Sep. 2004, vol. 240, Nos. 1-2, pp. 237-255.
Girnus, "Synthesis of $AlPO_4$-5 Aluminum Phosphate Molecular Sieve Crystals for Membrane Applications by Microwave Heating", Advanced Materials, 1995, vol. 7, No. 8, pp. 701-714.
Hao, "The Pervaporation Properties of Sulfonyl-Containing Polyimide Membranes to Aromatic-Aliphatic Hydrocarbon Mixtures", Journal of Membrane Science, 1997, vol. 132, pp. 97-108.
Heitmann, "Influencing the Pervaporative Recovery of N-Butanol by Using Ionic Liquids", Procedia Engineering, Jan. 2012, vol. 44, pp. 1343-1344.
Heywood, "High Compression Ratio Turbo Gasoline Engine Operation Using Alcohol Enhancement", Final Report on US DOE Funded Project DE-EE0005444, Massachusetts Institute of Technology Sloan Automotive Laboratory, Cambridge, MA., Jan. 2016, 168 pages.
Hiemenz, Polymer Chemistry—The Basic Concepts (1984), 7 pages.
Hofmann, "Molecular Modelling of Pervaporation Separation of Binary Mixtures with Polymeric Membranes", Journal of Membrane Science, 1998, vol. 144, pp. 145-159.
Hoshi, "Separation of Organic Solvent from Dilute Aqueous Solutions and from Organic Solvent Mixtures Through Crosslinked Acrylate Copolymer Membranes by Pervaporation", Journal of Applied Polymer Science, 1998, vol. 69, pp. 1483-1494.
"Hydranautics: Spiral Wound Reverse Osmosis Elements" A 3.23-minute video available on YouTube, published on Dec. 11, 2007, [Last Accessed on Mar. 9, 2018], URL <https://www.youtube.com/watch?v=YIMGZWmh_Mw>, 2 pages.
Katarzynski, "Permeation Properties of Different Aromatic Substances in Multicomponent Aromatic/Aliphatic Pervaporation Experiments", Desalination, 2006, vol. 200, pp. 23-25.
Katarzynski, "Separation of Multi Component Aromatic-Aliphatic Mixtures by Pervaporation with Copolyimide Membranes", Desalination, 2006, vol. 189, pp. 81-86.
Kim, "Quantitative Microscopic Study of Surface Characteristics of Ultrafiltration Membranes", Journal of Membrane Science, Nov. 1990, vol. 54, Nos. 1-2, pp. 89-102.
Kim, "Selective Permeation of $CO_2$ Through Pore-Filled Polyacrylonitrile Membrane with Poly(Ethylene Glycol)", Journal of Membrane Science, May 2001, vol. 186, pp. 97-107.
Koelsch, "Zeolite-in-Metal Membranes: Preparation and Testing", Journal of the Chemical Society, Chemical Communications, 1994, vol. 21, pp. 2491-2492.
Kudo, "Research on Engine System making Effective Use of Bio-ethanol-blended Fuels", Japan Society of Automotive Engineers Technical Paper 20135048, JSAE Annual Congress (Spring), May 2013, 4 pages.
Larchet, "Separation of Benzene-n-Heptane Mixtures by Pervaporation with Elastomeric Membranes. I. Performance of Membranes", Journal of Membrane Science, 1983, vol. 15, pp. 81-96.
Larchet, "Separation of Benzene-n-Heptane Mixtures by Pervaporation with Elastomeric Membranes. II. Contribution of Sorption to the Separation Mechanism", Journal of Membrane Science, 1984, vol. 17, pp. 263-274.
Larchet, "Study of the Pervaporation of Aromatic and Aliphatic Hydrocarbon Mixtures Through Different Elastomer Membranes", *Chimiques*, 1979, vol. 287, pp. 31-34.
Li, "A Novel Atmospheric Dielectric Barrier Discharge (DBD) Plasma Graft-Filling Technique to Fabricate the Composite Membranes for Pervaporation of Aromatic-Aliphatic Hydrocarbons", Journal of Membrane Science, Apr. 2011, vol. 371, pp. 163-170.
Lopergolo, "Direct UV Photocrosslinking of Poly(N-Vinyl-2-Pyrrolidone) (PVP) to Produce Hydrogels", Polymer, Sep. 2003, vol. 44, No. 20, pp. 6217-6222.
Martinez De Yuso, "A Study of Chemical Modifications of a Nafion Membrane by incorporation of Different Room Temperature Ionic Liquids", Fuel Cells, Aug. 2012, vol. 12, No. 4, pp. 606-613.
Matsui, "A Simple Model for Pervaporative Transport of Binary Mixtures Through Rubbery Polymeric Membranes", Journal of Membrane Science, 2004, vol. 235, pp. 25-30.
Matsui, "Pervaporation Separation of Aromatic-Aliphatic Hydrocarbons By Crosslinked Poly(Methyl Acrylate-Co-Acrylic Acid) Membranes", Journal of Membrane Science, 2002, vol. 195, pp. 229-245.
Matsui, "Pervaporation Separation of Aromatic-Aliphatic Hydrocarbons by a Series of Ionically Crosslinked Poly(N-Alkyl Acrylate) Membranes", Journal of Membrane Science, 2003, vol. 213, pp. 67-83.
Miendersma, "Economical Feasibility of Zeolite Membranes for Industrial Scale Separations of Aromatic Hydrocarbons", Desalination, 2002, vol. 149, pp. 29-34.
Mika, "Ultra-Low-Pressure Water Softening with Pore-Filled Membranes", Desalination, Nov. 2001, vol. 140, No. 3, pp. 265-275.
Navarro, "Pore-Filling Electrolyte Membranes Based on Microporous Polyethylene Matrices Activated with Plasma and Sulfonated Hydrogenated Styrene Butadiene Block Copolymer. Synthesis, Microstructural and Electrical Characterization", Journal of Polymer Science, Part B: Polymer Physics, Aug. 2008, vol. 46, No. 16, pp. 1684-1695.
Ohst, "Polymer Structure-Properties Correlation of Polyurethane PV-Membranes for Aromatic/Aliphatic Separation", Proceedings of 5th International Conference on Pervaporation Processes in the Chemical Industry, Heidelberg, Germany, Mar. 1991, pp. 7-21.
Okada, "Predictability of Transport Equations for Pervaporation on the Basis of Pore-Flow Mechanism", Journal of Membrane Science, 1992, vol. 70, pp. 163-175.
Okamoto "Pervaporation of Aromatic/Non-Aromatic Hydrocarbon Mixtures Through Crosslinked Membranes of Polyimide with Pendant Phosphonate Ester Groups", Journal of Membrane Science, 1999, vol. 157, pp. 97-105.
Pandey, "Formation and Characterization of Highly Crosslinked Anion-Exchange Membranes", Journal of Membrane Science, Jun. 2003, vol. 217, pp. 117-130.
Partridge, "Onboard Gasoline Separation for Improved Vehicle Efficiency", SAE International Journal of Fuels and Lubricants, Jun. 2014, vol. 7, No. 2, pp. 366-378.
Peeva, "Factors Affecting the Sieving Behavior of Anti-Fouling Thin-Layer Cross-Linked Hydrogel Polyethersulfone Composite Ultrafiltration Membranes", Journal of Membrane Science, Feb. 2012, vol. 390-391, pp. 99-112.
Pithan, "Polymeric Membranes for Aromatic/Aliphatic Separation Processes", ChemPhysChem, 2002, vol. 3, pp. 856-862.
Qiu, "Nanofiltration Membrane Prepared from Cardo Polyetherketone Ultrafiltration Membrane by UV-Induced Grafting Method", Journal of Membrane Science, Jun. 2005, vol. 255, pp. 107-115.
Ray, "Development of New Synthetic Membranes for Separation of Benzene-Cyclohexane Mixtures by Pervaporation: A Solubility Parameter Approach", Industrial & Engineering Chemistry Research, 1997, vol. 36, pp. 5265-5276.

(56) References Cited

OTHER PUBLICATIONS

Ren, "Separation of Aromatics/Aliphatics with Crosslinked 6FDA-Based Copolyimides", Separation and Purification Technology, 2001, vol. 22-23, pp. 31-43.
Robeson, "Poly(Trimethylsilylpropyne) Utility as a Polymeric Absorbent for Removal of Trace Organics from Air and Water Sources", Separation Science and Technology, 1992, vol. 27, No. 10, pp. 1245-1258.
Roizard, "Preparation and Study of Crosslinked Polyurethane Films to Fractionate Toluene-N-Heptane Mixtures by Pervaporation", Separation and Purification Technology, 2001, vol. 22-23, pp. 45-52.
Schauer, "Polyurethane pervaporation membranes", Die Angewandte Makromolekulare Chemie, 1999, vol. 268, pp. 41-45.
Schepers, "Molecular Simulation Study on Sorption and Diffusion Processes in Polymeric Pervaporation Membrane Materials", Molecular Simulation, Feb. 2006, vol. 32, No. 2, pp. 73-83.
Schwarz, "Polyelectrolyte membranes for Aromatic-Aliphatic Hydrocarbon Separation by Pervaporation", Journal of Membrane Science, 2005, vol. 247, pp. 143-152.
Scindia, "Coupled-Diffusion Transport of Cr(VI) Across Anion-Exchange Membranes Prepared by Physical and Chemical Immobilization Methods", Journal of Membrane Science, Mar. 2005, vol. 249, pp. 143-152.
"Scotch-Weld Brand DP-760 Part A", 3M Material Safety Data Sheet, Aug. 2008, 8 pages.
"Scotch-Weld Brand DP-760 Part B", 3M Material Safety Data Sheet, Feb. 2007, 7 pages.
Semenova, "Polymer Membranes for Hydrocarbon Separation and Removal", Journal of Membrane Science, Mar. 2004, vol. 231, pp. 189-207.
Smitha, "Separation of Organic-Organic Mixtures by Pervaporation—A Review", Journal of Membrane Science, Sep. 2004, vol. 241, No. 1, pp. 1-21.
Stephan "Separation of Aliphatic/Aromatic Mixtures by Pervaporation Using Polyurethane Membranes. Model Calculations and Comparison with Experimental Results", Proceedings of Sixth International Conference on Pervaporation Processes in the Chemical Industry: Ottawa, Canada, Sep. 1992, pp. 292-304.
Stewart, "Membrane Separations Using Functionalized Polyphosphazene Materials", ACS Symposium Series, 2004, vol. 876, pp. 177-189.
Thompson, "Theoretical Transport Model of Diffusive Membrane Pervaporation and Comparison of Model Predictions with Experimental Results", American Institute of Chemical Engineers National Meeting, Houston, Texas, Apr. 1987, 12 pages.
Ueda, "Membrane Separation of Ethanol from Mixtures of Gasoline and Bioethanol with Heat-Treated PVA Membranes", Industrial & Engineering Chemistry Research, 2011, vol. 50, No. 2, pp. 1023-1027.
Ulbricht, "Novel High-Performance Photo-Graft Composite Membranes for Separation of Organic Liquids by Pervaporation," Journal of Membrane Sciences, Dec. 1997, vol. 136, pp. 25-33.
Van Ackern, "Ultrathin Membranes for Gas Separation and Pervaporation Prepared Upon Electrostatic Self-Assembly of Polyelectrolytes", Thin Solid Films, 1998, vol. 327-329, pp. 762-766.
Villaluenga, "A Review on The Separation of Benzene-Cyclohexane Mixtures by Pervaporation Processes", Journal of Membrane Sciences, May 2000, vol. 169, No. 2, pp. 159-174.
Wang, "Crosslinking of Polyvinyl Chloride by Electron Beam Irradiation in The Presence of Ethylene-Vinyl Acetate Copolymer", Journal of Applied Polymer Science, 2004, vol. 91, pp. 1571-1575.
Wang, "Pervaporation of Aromatic-Non-Aromatic Hydrocarbon Mixtures Through Plasma-Grafted Membranes", Journal of Membrane Science, Mar. 1999, vol. 154, No. 2, pp. 221-228.
Wang, "Pervaporation Properties of Aromatic-Nonaromatic Hydrocarbons of Crosslinked Membranes of Copolymers Based on Diethyl Vinylbenzylphosphonate", Journal of Applied Polymer Science, 2003, vol. 87, pp. 2177-2185.
Wang, "Pervaporation Properties to Aromatic-Non-Aromatic Hydrocarbon Mixtures of Cross-Linked Membranes of Copoly(Methacrylates) With Pendant Phosphate and Carbamoylphosphonate Groups", Journal of Membrane Science, Apr. 2002, vol. 199, No. 1-2, pp. 13-27.
Wang, "Preparation and Properties of Pore-Filling Membranes Based on Sulfonated Copolyimides and Porous Polymide Matrix," Polymer, Jul. 2012, vol. 53, No. 15, pp. 3154-3162.
Wang, "Self-initiated Photopolymerization and Photografting of Acrylic Monomers," Macromolecular Rapid Communications, May 2004, vol. 25, No. 11, pp. 1095-1099.
Wang, "Sorption and Pervaporation Properties of Crosslinked Membranes of Poly(Ethylene Oxide Imide) Segmented Copolymer to Aromatic/Nonaromatic Hydrocarbon Mixtures", Journal of Polymer Science: Part B, Polymer Physics, Jul. 2000, vol. 38, No. 13, pp. 1800-1811.
White, "Development of Large-Scale Applications in Organic Solvent Nanofiltration and Pervaporation for Chemical and Refining Processes", Journal of Membrane Science, Dec. 2006, vol. 286, No. 1-2, pp. 26-35.
White, "New Applications of Organic Solvent Nanofiltration and Pervaporation in Chemical and Refining Processes", AIChE Paper, AIChE Annual Meeting 2005, 2 pages.
Wight, "Oxygen Inhibition of Acrylic Photopolymerization," Journal of Polymer Science Part C, Polymer Letters Edition, Mar. 1978, vol. 16, No. 3, pp. 121-127.
Xu, "Carboxylic Acid Containing Polyimides for Pervaporation Separations of Toluene-iso-Octane Mixtures", Journal of Membrane Science, Jul. 2003, vol. 219, No. 1-2, pp. 89-102.
Yamaguchi, "A Pore-Filling Electrolyte Membrane-Electrode Integrated System for a Direct Methanol Fuel Cell Application", Journal of Electrochemical Society, 2002, vol. 149, No. 11, pp. A1448-A1453.
Yamaguchi, "An Extremely Low Methanol Crossover and Highly Durable Aromatic Pore-Filling Electrolyte Membrane for Direct Methanol Fuel Cells", Advanced Materials, Feb. 2007, vol. 19, No. 4, pp. 592-596.
Yamaguchi, "Plasma-Graft Filling Polymerization: Preparation of a New Type of Pervaporation Membrane for Organic Liquid Mixtures", Macromolecules, 1991, vol. 24, pp. 5522-5527.
Yamaguchi, "Solubility and Pervaporation Properties of the Filling-Polymerized Membrane Prepared by Plasma-Graft Polymerization for Pervaporation of Organic-Liquid Mixtures", Industrial & Engineering Chemistry Research, 1992, vol. 31, pp. 1914-1919.
Yang, "Advances in Pervaporation Membranes for Separating Mixtures of Aromatic and Aliphatic Hydrocarbons", Progress in Chemistry, Jul. 2001, vol. 13, No. 4, pp. 303-309.
Yeom, "A New Method for Determining the Diffusion Coefficients of Penetrants Through Polymeric Membranes from Steady-State Pervaporation Experiments", Journal of Membrane Science, 1992, vol. 68, pp. 11-20.
Yildrim "Separation of Benzene-Cyclohexane Mixtures by Pervaporation using PEBA Membranes", Desalination, Jan. 2008, vol. 219, No. 1-3, pp. 14-25.
Yoo, "$CO_2$ Separation Membranes Using Ionic Liquids in a Nafion Matrix", Journal of Membrane Science, Nov. 2010, vol. 363, pp. 72-79.
Yuan Xu, "Synthesized Polyimide Membranes for Pervaporation Separations of Toluene-ISO-Octane Mixtures", The University of Texas Thesis, Dec. 2005, 187 pages.
Zeng, "A New Group-Contribution Model of Mass Transport Through Dense Polymeric Membrane and Its Application I: A Universal Model Format for Dense Polymeric Membrane", ACS Paper, 232nd National Meeting, Sep. 2006, 1 page.
Zhao, "Functionalized Metal-Organic Polyhedra Hybrid Membranes for Aromatic Hydrocarbons Recovery", The American Institute of Chemical Engineers(AIChE) Journal, Oct. 2016, vol. 62, No. 10, pp. 3706-3716.
Zhao, "Sorption and Transport of Methanol and Ethanol in $H^+$-Nafion", Polymer, Mar. 2012, vol. 53, No. 6, pp. 1267-1276.
International Search Report for PCT International Application No. PCT/US2016/040650, dated Sep. 20, 2016, 6 pages.

\* cited by examiner

PVP- AND/OR PVL-CONTAINING COMPOSITE MEMBRANES AND METHODS OF USE

CROSS REFERENCE TO RELATED APPLICATIONS

This application is a national stage filing under 35 U.S.C. 371 of PCT/US2016/040650, filed Jul. 1, 2016, which claims the benefit of U.S. Provisional Application No. 62/187,497, filed Jul. 1, 2015, the disclosures of which are incorporated by reference in their entireties herein.

BACKGROUND

Separation membranes are known; however, there is a continual need for effective composite membranes.

SUMMARY OF THE INVENTION

The present disclosure provides composite membranes and methods of use of such membranes in separation techniques. Generally, the composite membranes include a porous substrate (i.e., a support substrate that may include one or more layers) that includes opposite first and second major surfaces, and a plurality of pores; and a polymer composition disposed in and/or on the porous substrate (disposed in at least some of the plurality of pores so as to form a layer having a thickness). In certain embodiments the layer is a continuous layer. For composite membranes that are asymmetric, the amount of the polymer at, or adjacent to, the first major surface is greater than the amount of the polymer at, or adjacent to, the second major surface.

The polymer composition is:
(a) a PVP-containing polymer composition that is not a pore-filling polymer composition;
(b) a PVP-containing polymer composition comprising greater than 75 weight percent (wt %) PVP, wherein the PVP-containing polymer composition is disposed in and/or on the porous substrate;
(c) a PVP-containing polymer composition comprising one or more additional polymers that does not include a polymer derived from one or more ethylenically unsaturated monomers and/or oligomers, wherein the PVP-containing polymer composition is disposed in and/or on the porous substrate; or
(d) a PVL-containing polymer composition disposed in and/or on the porous substrate.

Such membranes are particularly useful for selectively pervaporating a first liquid from a mixture that includes the first liquid and a second liquid, generally because the polymer composition is more permeable to the first liquid (e.g., alcohol) than the second liquid (e.g., gasoline). Furthermore, the polymer composition is not soluble in the first liquid, the second liquid, or a mixture thereof.

Such membranes may be included in a cartridge, which may be part of a system such as a flex-fuel engine.

The present disclosure also provides methods. For example, the present disclosure provides a method of separating a first liquid (e.g., ethanol) from a mixture of the first liquid (e.g., ethanol) and a second liquid (e.g., gasoline), the method comprising contacting the mixture with a composite membrane (preferably, an asymmetric composite membrane) as described herein.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each

DETAILED DESCRIPTION OF ILLUSTRATIVE EMBODIMENTS

Figure 1:
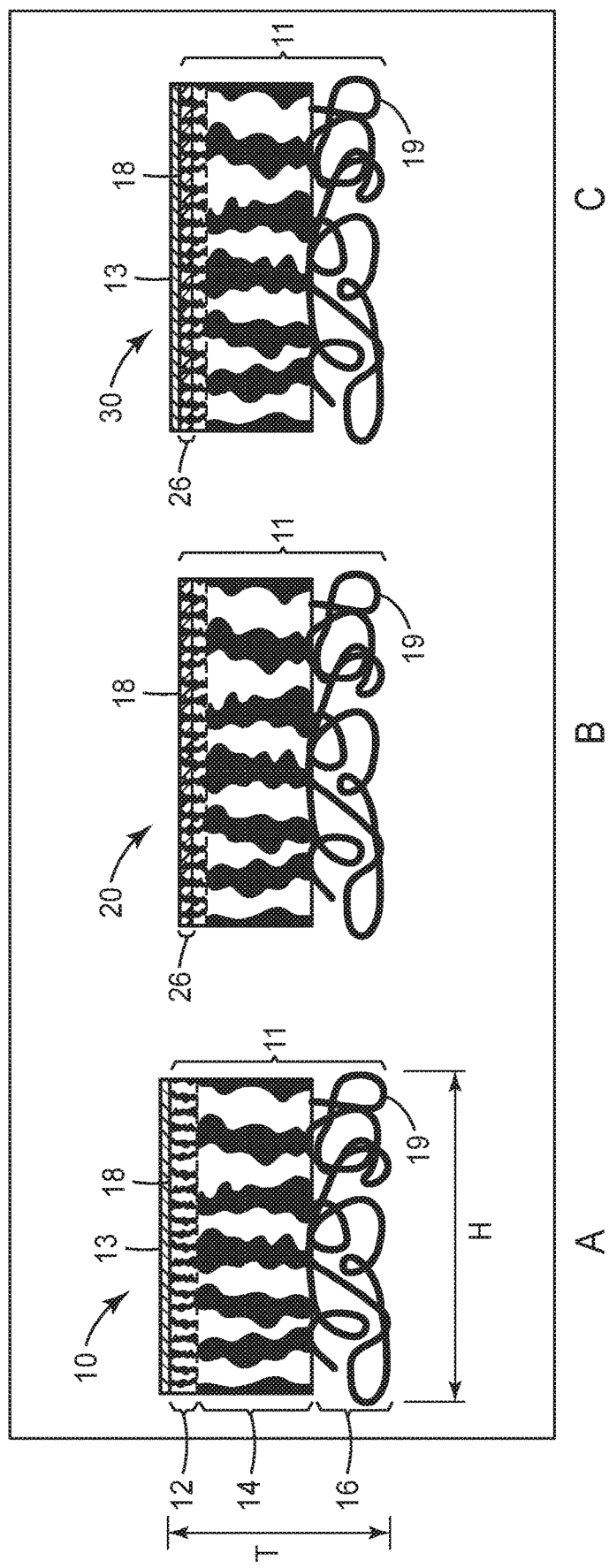
FIGS. 1A, 1B, and 1C are cross-sectional schematic views of exemplary porous substrates and an asymmetric composite membranes of the present disclosure. The porous structure of the porous substrate is not to scale and not representative of the actual structure.

The present disclosure provides composite membranes (preferably, asymmetric composite membranes) that include a porous substrate and a polymer composition that may be disposed in and/or on the porous substrate. The porous substrate has opposite first and second major surfaces, and a plurality of pores.

In certain embodiments, the polymer composition is a pore-filling polymer composition that is disposed in at least some of the pores. In certain embodiments, the polymer composition is not a pore-filling polymer composition.

In certain embodiments in which the composite membranes are asymmetric composite membranes the amount of the polymer composition at, or adjacent to, the first major surface is greater than the amount of the polymer composition at, or adjacent to, the second major surface. Hence, a composite membrane is asymmetric with respect to the amount of polymer composition throughout the thickness of the porous substrate.

The polymer composition used to form a composite membrane of the present disclosure is at least one of:

(a) a PVP-containing polymer composition that is not a pore-filling polymer composition;

(b) a PVP-containing polymer composition comprising greater than 75 wt % PVP, wherein the PVP-containing polymer composition is disposed in and/or on the porous substrate;

(c) a PVP-containing polymer composition comprising one or more additional polymers that does not include a polymer derived from one or more ethylenically unsaturated monomers and/or oligomers, wherein the PVP-containing polymer composition is disposed in and/or on the porous substrate; or (d) a PVL-containing polymer composition disposed in and/or on the porous substrate.

Such composite membranes may be used in various separation methods, including pervaporation, gas separation, vapor permeation, nanofiltration, organic solvent nanofiltration, and combinations thereof (e.g., a combination of pervaporation and vapor permeation). Such separation methods may be used to separate a first fluid (i.e., liquid and/or vapor) from a feed mixture of a first fluid (i.e., liquid and/or vapor) and a second fluid (i.e., liquid and/or vapor). The preferred separation membranes of the present disclosure are particularly useful in pervaporation methods to separate a first liquid from a feed mixture of a first liquid and a second liquid.

In certain embodiments, the composite membranes (preferably, asymmetric composite membranes) include a porous substrate and a polymer composition. The porous substrate has opposite first and second major surfaces, and a plurality of pores. The polymer composition may be disposed only on the surface of the porous substrate, disposed only in at least a portion of the plurality of pores (forming a pore-filling polymer layer), or the polymer composition may be disposed on the surface and in at least a portion of the pores (forming a pore-filling polymer layer).

In certain embodiments in which the composite membranes are asymmetric composite membranes, the amount of the polymer composition at, or adjacent to, the first major surface is greater than the amount of the polymer composition at, or adjacent to, the second major surface. Hence, a composite membrane is asymmetric with respect to the amount of polymer composition (pore-filling polymer) throughout the thickness of the porous substrate.

Such separation membranes may be used in various separation methods, including pervaporation, gas separation, vapor permeation, nanofiltration, organic solvent nanofiltration, and combinations thereof (e.g., a combination of pervaporation and vapor permeation). Such separation methods may be used to separate a first fluid (i.e., liquid and/or vapor) from a feed mixture of a first fluid (i.e., liquid and/or vapor) and a second fluid (i.e., liquid and/or vapor). The preferred separation membranes of the present disclosure are particularly useful in pervaporation methods to separate a first liquid from a feed mixture of a first liquid and a second liquid.

In certain embodiments, separation membranes of the present disclosure are composite membranes and include a porous substrate (i.e., a support substrate which may be in the form of one or more porous layers) that includes opposite first and second major surfaces, and a plurality of pores; and a polymer composition that forms a layer having a thickness in and/or on the porous substrate. In certain embodiments, the polymer composition layer is preferably a continuous layer. The amount of the polymer composition at, or adjacent to, the first major surface is greater than the amount of the polymer composition at, or adjacent to, the second major surface in an asymmetric composite membrane.

FIG. 1 provides illustrations of: a first exemplary asymmetric composite membrane 10 that includes a porous substrate 11 with polymer composition coated only in a layer 13 on first major surface 18 of the porous substrate (FIG. 1A); a second exemplary asymmetric composite membrane 20 that includes porous substrate 11 with polymer composition coated only in a portion of the pores of the porous substrate forming a pore-filling polymer layer 26 adjacent to major surface 18 (FIG. 1B); and an exemplary asymmetric composite membrane 30 with polymer composition coated both in a layer 13 on first major surface 18 and in a portion of the pores of the porous substrate forming a pore-filling polymer layer 26 adjacent to major surface 18 (FIG. 1C), all shown in vertical cross-section.

The exemplary porous substrate 11 shown in FIG. 1 includes three layers that include a nanoporous layer 12, a microporous layer 14, and a macroporous layer 16 (FIG. 1A) having a first major surface 18 and a second major surface 19. It should be understood that a porous substrate suitable for use in the composite membranes of the present disclosure does not require either a nanoporous layer 12 or a macroporous layer 16.

In a porous substrate 11, the pores are interconnected vertically (i.e., throughout the thickness "T" of the porous substrate 11, see FIG. 1A). In certain preferred embodiments, the pores of the porous substrate 11 are interconnected horizontally (e.g., as in a microfiltration membrane) along dimension "H" (see FIG. 1A). In such embodiments, the pore-filling polymer layer 26 (FIGS. 1B and 1C) formed by the pore-filling polymer composition is preferably a continuous layer. If the pores of the porous substrate 11 are not all interconnected horizontally (along dimension "H"), the layer 26 is discontinuous (i.e., the pore-filling polymer forms a plurality of discreet regions within the porous substrate). It will be understood that dimension "H" generally refers to the plane of the porous substrate and is exemplary of all the various horizontal dimensions within a horizontal slice of the substrate (shown in vertical cross-section). Whether layer 26 is continuous or discontinuous, for the asymmetric composite membrane, the amount of the pore-filling polymer composition at, or adjacent to, the first major surface 18 is greater than the amount of the polymer at, or adjacent to, the second major surface 19.

Referring to FIG. 1A, the polymer composition forms a coating 13 on (i.e., covers) the top surface 18 of the substrate 11. Referring to FIG. 1C, the polymer composition forms a coating 13 on (i.e., covers) the top surface 18 of the substrate 11 in addition to being within the pores of the substrate forming layer 26. This coating layer 13 may be continuous or discontinuous.

Thus, in certain embodiments, the polymer composition is in the form of a pore-filling polymer layer 26 (FIG. 1C) that forms at least a portion of the first major surface 18 of the porous substrate. In certain embodiments, the polymer composition is in the form of a pore-filling polymer layer having an exposed major surface, which coats the first major surface of the porous substrate, and an opposite major surface disposed between the opposite first and second major surfaces of the porous substrate. In certain embodiments, the exposed major surface of the polymer composition layer coats all the first major surface of the porous substrate.

As used herein, a continuous layer refers to a substantially continuous layer as well as a layer that is completely continuous. That is, as used herein, any reference to the polymer composition layer coating or covering the first major surface of the porous substrate includes the polymer composition layer coating all, substantially all, or only a portion of the first major surface of the porous substrate. The polymer composition layer is considered to coat substantially all of the first major surface of the porous substrate (i.e., be substantially continuous), when enough of the first major surface of the porous substrate is coated such that the composite membrane is able to selectively separate (e.g., pervaporate) a desired amount of a first fluid (e.g., first liquid such as alcohol) from a mixture of the first fluid (e.g., first liquid) with a second fluid (e.g., second liquid such as gasoline). In particular, the flux and the selectivity of the separation membrane (with a "continuous layer" of polymer composition) is sufficient for the particular system in which the membrane is used.

In certain embodiments, the polymer composition layer (both layer 13 and/or pore-filling layer 26) has a thickness in the range of from 10 nm up to and including 50,000 nm (50 microns), or up to and including 20,000 nm. More specifically, the thickness of the polymer composition layer may include, in increments of 1 nm, any range between 10 nm and 20,000 nm. For example, the thickness of the polymer composition layer may be in the range of from 11 nm to 5999 nm, or 20 nm to 6000 nm, or 50 nm to 5000 nm, etc.

Composite membranes of the present disclosure may further include at least one of: (a) an ionic liquid mixed with the polymer composition; or (b) an amorphous fluorochemical film disposed on the composite membrane, typically, on the side of the membrane the feed mixture enters. Such composite membranes demonstrate improved performance (e.g., flux) and/or durability over the same composite membranes without either the ionic liquid or the amorphous fluorochemical film.

Pervaporation

Pervaporation is a process that involves a membrane in contact with a liquid on the feed or upstream side and a vapor on the "permeate" or downstream side. Usually, a vacuum and/or an inert gas is applied on the vapor side of the membrane to provide a driving force for the process. Typically, the downstream pressure is lower than the saturation pressure of the permeate.

Vapor permeation is quite similar to pervaporation, except that a vapor is contacted on the feed side of the membrane instead of a liquid. As membranes suitable for pervaporation separations are typically also suitable for vapor permeation separations, use of the term "pervaporation" may encompass both "pervaporation" and "vapor permeation."

Pervaporation may be used for desulfurization of gasoline, dehydration of organic solvents, isolation of aroma compounds or components, and removal of volatile organic compounds from aqueous solutions. In certain embodiments of the present disclosure, the asymmetric composite membranes are used for pervaporating alcohol from an alcohol and gasoline mixture.

Separation membranes described herein are particularly useful for selectively pervaporating a first liquid from a mixture that includes the first liquid and a second liquid, generally because the polymer composition is more permeable to the first liquid than the second liquid.

In certain embodiments, the first liquid is a more polar liquid than the second liquid. The second liquid may be a nonpolar liquid.

In certain embodiments, the first liquid may be water, an alcohol (such as ethanol, methanol, 1-propanol, 2-propanol, 1-methoxy-2-propanol, or butanol), or an organic sulfur-containing compound (such as thiophene, tetrahydrothiophene, benzothiophene, 2-methylthiophene, or 2,5-dimethylthiophene).

In certain embodiments, the second liquid may be gasoline, an aliphatic or aromatic hydrocarbon (e.g., benzene, hexane, or cyclohexane), or an ether (such as methyl-tert-butylether, ethyl-tert-butylether).

In certain embodiments, the first liquid is an alcohol, and the second liquid is gasoline. Thus, in one embodiment of the present disclosure, an asymmetric composite membrane for selectively pervaporating alcohol from an alcohol and gasoline mixture is provided. This asymmetric composite membrane includes: a porous substrate having opposite first and second major surfaces, and a plurality of pores; and a pore-filling polymer disposed in at least some of the pores so as to form a continuous layer having a thickness, with the amount of the polymer at, or adjacent to, the first major surface being greater than the amount of the pore-filling polymer at, or adjacent to, the second major surface, wherein the polymer is more permeable to alcohol than gasoline.

Porous Substrate

The porous substrate itself may be asymmetric or symmetric. The porous substrate may include one layer or multiple layers. For example, there may be two, three, four, or more layers. In some embodiments, the porous substrate is hydrophobic. In other embodiments, the porous substrate is hydrophilic.

If the porous substrate is asymmetric (before being combined with the polymer composition), the first and second major surfaces have porous structures with different pore morphologies. For example, the porous substrate may have pores of differing sizes throughout its thickness. Analogously, if the porous substrate is symmetric (before being combined with the polymer composition), the major surfaces have porous structures wherein their pore morphologies are the same. For example, the porous substrate may have pores of the same size throughout its thickness.

Referring to FIG. 1A, an asymmetric substrate is shown with different pore morphologies at the first major surface 18 and the second major surface 19. More specifically, there are three layers each of different pore size such that the overall substrate has pores of differing sizes throughout its thickness "T." In certain embodiments, nanoporous layer 12 alone could function as the porous substrate. In such embodiments, the porous substrate would be symmetric.

Suitable porous substrates include, for example, films, porous membranes, woven webs, nonwoven webs, hollow fibers, and the like. For example, the porous substrates may be made of one or more layers that include films, porous films, micro-filtration membranes, ultrafiltration membranes, nanofiltration membranes, woven materials, and nonwoven materials. The materials that may be used for each of the above-mentioned supports may be organic in nature (such as the organic polymers listed below), inorganic in nature (such as aluminum, steels, and sintered metals and/or ceramics and glasses), or a combination thereof. For example, the porous substrate may be formed from polymeric materials, ceramic and glass materials, metal, and the like, or combinations (i.e., mixtures and copolymers) thereof.

In composite membranes of the present disclosure, materials that withstand hot gasoline environment and provide sufficient mechanical strength to the composite membranes are preferred. Materials having good adhesion to each other are particularly desirable. In certain embodiments, the porous substrate is preferably a polymeric porous substrate.

Suitable polymeric materials include, for example, polystyrene, polyolefins, polyisoprenes, polybutadienes, fluorinated polymers (e.g., polyvinylidene fluoride (PVDF), ethylene-co-chlorotrifluoroethylene copolymer (ECTFE), polytetrafluoroethylene (PTFE)), polyvinyl chlorides, polyesters (PET), polyamides (e.g., various nylons), polyimides, polyethers, poly(ether sulfone)s, poly(sulfone)s, poly(phenylene sulfone)s, polyphenylene oxides, polyphenylene sulfides (PPS), poly(vinyl acetate)s, copolymers of vinyl acetate, poly(phosphazene)s, poly(vinyl ester)s, poly(vinyl ether)s, poly(vinyl alcohol)s, polycarbonates, polyacrylonitrile, polyethylene terephthalate, cellulose and its derivatives (such as cellulose acetate and cellulose nitrate), and the like, or combinations (i.e., mixtures or copolymers) thereof.

Suitable polyolefins include, for example, poly(ethylene), poly(propylene), poly(1-butene), copolymers of ethylene and propylene, alpha olefin copolymers (such as copolymers of 1-butene, 1-hexene, 1-octene, and 1-decene), poly(ethylene-co-1-butene), poly(ethylene-co-1-butene-co-1-hexene), and the like, or combinations (i.e., mixtures or copolymers) thereof.

Suitable fluorinated polymers include, for example, polyvinylidene fluoride (PVDF), polyvinyl fluoride, copolymers of vinylidene fluoride (such as poly(vinylidene fluoride-co-hexafluoropropylene)), copolymers of chlorotrifluoroethylene (such as ethylene-co-chlorotrifluoroethylene copolymer), polytetrafluoroethylene, and the like, or combinations (i.e., mixtures or copolymers) thereof.

Suitable polyamides include, for example, poly(imino(1-oxohexamethylene)), poly(iminoadipoylimino hexamethylene), poly(iminoadipoyliminodecamethylene), polycaprolactam, and the like, or combinations thereof.

Suitable polyimides include, for example, poly(pyromellitimide), polyetherimide, and the like.

Suitable poly(ether sulfone)s include, for example, poly(diphenylether sulfone), poly(diphenylsulfone-co-diphenylene oxide sulfone), and the like, or combinations thereof.

Suitable polyethers include, for example, polyetherether ketone (PEEK).

Such materials may be photosensitive or non-photosensitive. Photosensitive porous substrate materials may act as a photoinitiator and generate radicals which initiate polymerization under radiation sources, such as UV radiation, so that the filled polymer or the coated polymer could covalently bond to the porous substrate. Suitable photosensitive materials include, for example, polysulfone, polyethersulfone, polyphenylenesulfone, PEEK, polyimide, PPS, PET, and polycarbonate. Photosensitive materials are preferably used for nanoporous layers.

Suitable porous substrates may have pores of a wide variety of sizes. For example, suitable porous substrates may include nanoporous membranes, microporous membranes, microporous nonwoven/woven webs, microporous woven webs, microporous fibers, nanofiber webs and the like. In some embodiments, the porous substrate may have a combination of different pore sizes (e.g., micropores, nanopores, and the like). In one embodiment, the porous substrate is microporous.

In some embodiments, the porous substrate includes pores that may have an average pore size less than 10 micrometers (μm). In other embodiments, the average pore size of the porous substrate may be less than 5 μm, or less than 2 μm, or less than 1 μm.

In other embodiments, the average pore size of the porous substrate may be greater than 10 nm (nanometer). In some embodiments, the average pore size of the porous substrate is greater than 50 nm, or greater than 100 nm, or greater than 200 nm.

In certain embodiments, the porous substrate includes pores having an average size in the range of from 0.5 nm up to and including 1000 μm. In some embodiments, the porous substrate may have an average pore size in a range of 10 nm to 10 μm, or in a range of 50 nm to 5 μm, or in a range of 100 nm to 2 μm, or in a range of 200 nm to 1 μm.

In certain embodiments, the porous substrate includes a nanoporous layer. In certain embodiments, the nanoporous layer is adjacent to or defines the first major surface of the porous substrate. In certain embodiments, the nanoporous layer includes pores having a size in the range of from 0.5 nanometer (nm) up to and including 100 nm. In accordance with the present disclosure, the size of the pores in the nanoporous layer may include, in increments of 1 nm, any range between 0.5 nm and 100 nm. For example, the size of the pores in the nanoporous layer may be in the range of from 0.5 nm to 50 nm, or 1 nm to 25 nm, or 2 nm to 10 nm, etc. Molecular Weight Cut-Off (MWCO) is typically used to correlate to the pore size. That is, for nanopores, the molecular weight of a polymer standard (retain over 90%) such as dextran, polyethylene glycol, polyvinyl alcohol, proteins, polystyrene, poly(methylmethacrylate) may be used to characterize the pore size. For example, one supplier of the porous substrates evaluates the pore sizes using a standard test, such as ASTM E1343-90-2001 using polyvinyl alcohol.

In certain embodiments, the porous substrate includes a microporous layer. In certain embodiments, the microporous layer is adjacent to or defines the first major surface of the porous substrate. In certain embodiments, the microporous layer includes pores having a size in the range of from 0.01 µm up to and including 20 µm. In accordance with the present disclosure, the size of the pores in the microporous layer may include, in increments of 0.05 µm, any range between 0.01 µm up and 20 µm. For example, the size of the pores in the microporous layer may be in the range of from 0.05 µm to 10 µm, or 0.1 µm to 5 µm, or 0.2 µm to 1 µm, etc. Typically, the pores in the microporous layer may be measured by mercury porosimetry for average or largest pore size, bubble point pore size measurement for the largest pores, Scanning Electron Microscopy (SEM) and/or Atom Force Microscopy (AFM) for the average/largest pore size.

In certain embodiments, the porous substrate includes a macroporous layer. In certain embodiments, the macroporous layer is adjacent to or defines the first major surface of the porous substrate. In certain embodiments, the macroporous layer is embedded between two microporous layers, for example a BLA020 membrane obtained from 3M Purification Inc.

In certain embodiments, the macroporous layer comprises pores having a size in the range of from 1 µm and 1000 µm. In accordance with the present disclosure, the size of the pores in the macroporous layer may include, in increments of 1 µm, any range between 1 µm up to and including 1000 µm. For example, the size of the pores in the macroporous substrate may be in the range of from 1 µm to 500 µm, or 5 µm to 300 µm, or 10 µm to 100 µm, etc. Typically, the size of the pores in the macroporous layer may be measured by Scanning Electron Microscopy, or Optical Microscopy, or using a Pore Size Meter for Nonwovens.

The macroporous layer is typically preferred at least because the macropores not only provide less vapor transport resistance, compared to microporous or nanoporous structures, but the macroporous layer can also provide additional rigidity and mechanical strength.

The thickness of the porous substrate selected may depend on the intended application of the membrane. Generally, the thickness of the porous substrate ("T" in FIG. 1A) may be greater than 10 micrometers (µm). In some embodiments, the thickness of the porous substrate may be greater than 1,000 µm, or greater than 5,000 µm. The maximum thickness depends on the intended use, but may often be less than or equal to 10,000 µm.

In certain embodiments, the porous substrate has first and second opposite major surfaces, and a thickness measured from one to the other of the opposite major surfaces in the range of from 5 µm up to and including 500 µm. In accordance with the present disclosure, the thickness of the porous substrate may include, in increments of 25 µm, any range between 5 µm and 500 µm. For example, the thickness of the porous substrate may be in the range of from 50 µm to 400 µm, or 100 µm to 300 µm, or 150 µm to 250 µm, etc.

In certain embodiments, the nanoporous layer has a thickness in the range of from 0.01 µm up to and including 10 µm. In accordance with the present disclosure, the thickness of the nanoporous layer may include, in increments of 50 nm, any range between 0.01 µm and 10 µm. For example, the thickness of the nanoporous layer may be in the range of from 50 nm to 5000 nm, or 100 nm to 3000 nm, or 500 nm to 2000 nm, etc.

In certain embodiments, the microporous layer has a thickness in the range of from 5 µm up to and including 300 µm. In accordance with the present disclosure, the thickness of the microporous layer may include, in increments of 5 µm, any range between 5 µm and 300 µm. For example, the thickness of the microporous layer may be in the range of from 5 µm to 200 µm, or 10 µm to 200 µm, or 20 µm to 100 µm, etc.

In certain embodiments, the macroporous layer has a thickness in the range of from 25 µm up to and including 500 µm. In accordance with the present disclosure, the thickness of the macroporous layer may include, in increments of 25 µm, any range between 25 µm up and 500 µm. For example, the thickness of the macroporous substrate may be in the range of from 25 µm to 300 µm, or 25 µm to 200 µm, or 50 µm to 150 µm, etc.

In certain embodiments, there may be anywhere from one to four layers in any combination within a porous substrate. The individual thickness of each layer may range from 5 nm to 1500 µm in thickness.

In certain embodiments, each layer may have a porosity that ranges from 0.5% up to and including 95%.

Polymer Compositions

In general, the polymer composition is insoluble in the liquids in which it comes into contact during use. More specifically, the polymer composition is more permeable to a first liquid than a second liquid. In certain embodiments, the polymer composition is not soluble in the first liquid, the second liquid, or a mixture thereof. As used herein, the polymer composition is considered to be insoluble in the first liquid (particularly, alcohol) or the second liquid (particularly, gasoline), or a mixture thereof, even if insignificant amounts of the polymer are soluble in the liquids. In the context of the end use, the solubility of the polymer composition is insignificant if the utility and lifetime of the composite membranes are not adversely affected.

In certain embodiments, the polymer composition is a polyvinyl lactam-containing (PVL-containing) polymer composition (embodiment "d"). "PVL-containing" means that the polymer composition may include other components, particularly polymeric components. It also means that the PVL polymer may be a PVL homopolymer or copolymer (which includes two or more different monomers). A PVL-containing polymer composition includes polyvinyl-β-propiolactam, polyvinyl-δ-valerolactam, polyvinyl-ε-caprolactam, or a combination thereof. Thus, as used herein, a PVL-containing polymer excludes polyvinyl pyrrolidone.

In certain embodiments, the polymer composition can be a polyvinyl pyrrolidone-containing (PVP-containing) polymer composition. "PVP-containing" means that the polymer composition may include other components, particularly polymeric components. PVP polymer may form an interpenetrating network (IPN) with other polymeric components if one or both are crosslinked. It also means that the PVP polymer may be a PVP homopolymer or copolymer. An exemplary PVP-containing copolymer is a PVP grafted PVA copolymer.

In certain embodiments, the PVP-containing polymer composition or the PVL-containing polymer composition is formed prior to contact with the porous substrate.

In certain embodiments, the PVP or PVL-containing polymer compositions include polymers having a molecular weight of at least 1,000 Daltons, and up to 10,000,000 Daltons.

The PVL-containing polymer compositions may be disposed in and/or on the porous substrate.

In certain embodiments, the PVP-containing polymer is not a pore-filling polymer composition (embodiment "a"). By this it is meant that the PVP-containing polymer composition does not penetrate significantly into the pores of the porous substrate. That is, a majority of polymer composition is on top of the substrate. If PVP blends with polymerizable compounds, PVP compositions can be coated first, followed by coating polymeriazable compounds and curing.

In certain embodiments, the PVP-containing polymer composition includes greater than 75 wt % PVP (embodiment "b"). Such PVP-containing polymer composition may be disposed in and/or on the porous substrate.

In certain embodiments, the PVP-containing polymer composition includes one or more additional polymers but does not include a polymer derived from one or more ethylenically unsaturated monomers and/or oligomers (embodiment "c"). Such PVP-containing polymer composition may be disposed in and/or on the porous substrate.

In the PVP-containing polymer compositions that do not include a polymer derived from one or more ethylenically unsaturated monomers and/or oligomers (embodiment "c"), such monomers and oligomers include (meth)acrylate-containing monomers and/or oligomers. (Meth)acrylate-containing monomers and/or oligomers that form polymers that are not included within the PVP-containing polymer compositions include polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, and 2-acrylamido-2-methylpropanesulfonic acid (AMPS). Other (meth)acrylate-containing monomers and/or oligomers that form polymers that are not included within the PVP-containing polymer compositions include polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H, 6H,6H-perfluorohydroxyldiacrylate, and a polyester tetra-acrylate. (Meth)acrylate-containing monomers and/or oligomers that form polymers that are not included within the PVP-containing polymer compositions include one or more of the following:

(a) di(meth)acryl-containing compounds such as dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, and tripropylene glycol diacrylate;

(b) tri(meth)acryl-containing compounds such as trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), and trimethylolpropane triacrylate;

(c) higher functionality (meth)acryl-containing compounds (i.e., higher than tri-functional) such as ditrimethylolpropane tetraacrylate, dipentaerythritol pentaacrylate, ethoxylated (4) pentaerythritol tetraacrylate, pentaerythritol tetraacrylate, and caprolactone modified dipentaerythritol hexaacrylate;

(d) oligomeric (meth)acryl compounds such as, for example, urethane acrylates, polyester acrylates, epoxy acrylates, silicone acrylates, polyacrylamide analogues of the foregoing, and combinations thereof (such compounds are widely available from vendors such as, for example, Sartomer Company, Exton, Pa., UCB Chemicals Corporation, Smyrna, Ga., and Aldrich Chemical Company, Milwaukee, Wis.);

(e) perfluoroalkyl meth(acryl)-containing compounds such as 1H,1H,6H,6H-perfluorohydroxyldiacrylate, 1H,1H-2,2,3,3,4,4,4-heptafluorobutyl acrylate, and perfluorocyclohexyl) methyl acrylate;

(f) charged meth(acryl)-containing compounds such as acrylic acid, 2-acrylamido-2-methylpropanefulfonic acid (AMPS), and [3-(Methacryloylamino)propyl]trimethylammonium chloride solution; and (g) polar polymerizable compounds such as 2-hydroxyethyl (meth)acrylate (HEMA), N-vinyl acetamide, N-vinyl pyrrolidone, (meth)acrylamide, and glycerol methacrylate.

The polymer composition may be crosslinked. It may be grafted to the porous (substrate) membrane (e.g., which may be in the form of a nanoporous layer). Or, it may be crosslinked and grafted to the porous substrate (e.g., nanoporous layer).

In certain embodiments, the polymer composition may swell in the presence of alcohol (e.g., ethanol) but not gasoline. When the polymer composition swells in the presence of the alcohol, the resultant alcohol-swollen polymer may be referred to as a gel.

Optional Ionic Liquids

In certain embodiments, separation membranes of the present disclosure further include one or more ionic liquids mixed in the polymer composition.

Such composite membranes demonstrate improved performance (e.g., flux) over the same separation membranes without the ionic liquids. Improved performance may be demonstrated by increased flux while maintaining good ethanol selectivity.

An ionic liquid (i.e., liquid ionic compound) is a compound that is a liquid under separation conditions. It may or may not be a liquid during mixing with the polymer composition, application to a substrate, storage, or shipping. In certain embodiments, the desired ionic liquid is liquid at a temperature of less than 100° C., and in certain embodiments, at room temperature.

Ionic liquids are salts in which the cation(s) and anion(s) are poorly coordinated. At least one of the ions is organic and at least one of the ions has a delocalized charge. This prevents the formation of a stable crystal lattice, and results in such materials existing as liquids at the desired temperature, often at room temperature, and at least, by definition, at less than 100° C.

In certain embodiments, the ionic liquid includes one or more cations selected from quaternary ammonium, imidazolium, pyrazolium, oxazolium, thiazolium, triazolium, pyridinium, piperidinium, pyridazinium, pyrimidinium, pyrazinium, pyrrolidinium, phosphonium, trialkylsulphonium, pyrrole, and guanidium.

In certain embodiments, the ionic liquid includes one or more anions selected from $Cl^-$, $Br^-$, $I^-$, $HSO_4^-$, $NO_3^-$, $SO_4^{2-}$, $CF_3SO_3^-$, $N(SO_2CF_3)_2^-$, $CH_3SO_3^-$, $B(CN)_4^-$, $C_4F_9SO_3^-$, $PF_6^-$, $N(CN)_4^-$, $C(CN)_4^-$, $BF_4^-$, $Ac^-$, $SCN^-$, $HSO_4^-$, $CH_3SO_4^-$, $C_2H_5SO_4^-$, and $C_4H_9SO_4^-$.

In certain embodiments, the ionic liquid is selected from 1-ethyl-3-methyl imidazolium tetrafluoroborate (Emim-$BF_4$), 1-ethyl-3-methyl imidazolium trifluoromethane sulfonate (Emim-TFSA), 3-methyl-N-butyl-pyridinium tetrafluoroborate, 3-methyl-N-butyl-pyridinium trifluoromethanesulfonate, N-butyl-pyridinium tetrafluoroborate, 1-butyl-2,3-dimethylimidazolium tetrafluoroborate, 1-butyl-2,3-dimethylimidazolium trifluoromethanesulfonate, 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium iodide, 1-butyl-3-methylimidazolium nitrate, 1-ethyl-3-methylimidazolium bromide, 1-ethyl-3-methylimidazolium iodide, 1-ethyl-3-methylimidazolium nitrate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methyl-imidazolium tetrafluoroborate, 1-ethyl-3-methylimidazolium ethylsulfate, 1-butyl-3-methylimidazolium acetate, 1-butyl-3-methylimidazolium trifluoroacetate, 1-butyl-3-methyl imidazolium bis(trifluormethylsulfonyl)imide (Bmim-$Tf_2N$), and combinations thereof.

Optional Fluorochemical Films

In certain embodiments, composite membranes of the present disclosure further include an amorphous fluorochemical film disposed on the separation membrane. Typically, the film is disposed on the side of the separation membrane the feed mixture enters.

In certain embodiments, such separation membranes demonstrate improved durability over the same separation membranes without the amorphous fluorochemical film. Improved durability may be demonstrated by reduced mechanical damage (e.g., abrasions, scratches, erosion, or crack generation upon membrane folding), reduced fouling, reduced chemical attack, and/or reduced performance decline after exposure to gasoline or ethanol/gasoline mixture under separation conditions.

In certain embodiments, such separation membranes demonstrate improved performance over the same separation membranes without the amorphous fluorochemical film. Improved performance may be demonstrated by increased flux.

In certain embodiments, such amorphous fluorochemical film typically has a thickness of at least 0.001 μm, or at least 0.03 μm. In certain embodiments, such amorphous fluorochemical film typically has a thickness of up to and including 5 μm, or up to and including 0.1 μm.

In certain embodiments, the amorphous fluorochemical film is a plasma-deposited fluorochemical film, as described in U.S. Pat. Pub. 2003/0134515.

In certain embodiments, the plasma-deposited fluorochemical film is derived from one or more fluorinated compounds selected from: linear, branched, or cyclic saturated perfluorocarbons; linear, branched, or cyclic unsaturated perfluorocarbons; linear, branched, or cyclic saturated partially fluorinated hydrocarbons; linear, branched, or cyclic unsaturated partially fluorinated hydrocarbons; carbonylfluorides; perfluorohypofluorides; perfluoroether compounds; oxygen-containing fluorides; halogen fluorides; sulfur-containing fluorides; nitrogen-containing fluorides; silicon-containing fluorides; inorganic fluorides (such as aluminum fluoride and copper fluoride); and rare gas-containing fluorides (such as xenon difluoride, xenon tetrafluoride, and krypton hexafluoride).

In certain embodiments, the plasma-deposited fluorochemical film is derived from one or more fluorinated compounds selected from $CF_4$, $SF_6$, $C_2F_6$, $C_3F_8$, $C_4F_{10}$, $C_5F_{12}$, $C_6F_{14}$, $C_7F_{16}$, $C_8F_{18}$, $C_2F_4$, $C_3F_6$, $C_4F_8$, $C_5F_{10}$, $C_6F_{12}$, $C_4F_6$, $C_7F_{14}$, $C_8F_{16}$, $CF_3COF$, $CF_2(COF)_2$, $C_3F_7COF$, $CF_3OF$, $C_2F_5OF$, $CF_3COOF$, $CF_3OCF_3$, $C_2F_5OC_2F_5$, $C_2F_4OC_2F_4$, $OF_2$, $SOF_2$, $SOF_4$, $NOF$, $ClF_3$, $IF_5$, $BrF_5$, $BrF_3$, $CF_3I$, $C_2F_5I$, $N_2F_4$, $NF_3$, $NOF_3$, $SiF_4$, $SiF_4$, $Si_2F_6$, $XeF2$, $XeF_4$, $KrF_2$, $SF_4$, $SF_6$, monofluorobenzene, 1,2-difluorobenzene, 1,2,4-trifluorobenzene, pentafluorobenzene, pentafluoropyridine, and pentafluorotolenene.

In certain embodiments, the plasma-deposited fluorochemical film is derived from one or more hydrocarbon compounds in combination with one or more fluorinated compounds. Examples of suitable hydrocarbon compounds include acetylene, methane, butadiene, benzene, methylcyclopentadiene, pentadiene, styrene, naphthalene, and azulene.

Typically, fluorocarbon film plasma deposition occurs at rates ranging from 1 nanometer per second (nm/sec) to 100 nm/sec depending on processing conditions such as pressure, power, gas concentrations, types of gases, and the relative size of the electrodes. In general, deposition rates increase with increasing power, pressure, and gas concentration. Plasma is typically generated with RF electric power levels of at least 500 watts and often up to and including 8000 watts, with a typical moving web speed or at least 1 foot per minute (fpm) (0.3 meter per minute (m/min) and often up to and including 300 fpm (90 m/min). The gas flow rates, e.g., of the fluorinated compound and the optional hydrocarbon compound, is typically at least 10 (standard cubic centimeters per minutes) sccm and often up to and including 5,000 sccm. In some embodiment, the fluorinated compound is carried by an inert gas such as argon, nitrogen, helium, etc.

In certain embodiments, the amorphous fluorochemical film includes an amorphous glassy perfluoropolymer having a Tg (glass transition temperature) of at least 100° C.

Examples of suitable amorphous glassy perfluoropolymers include a copolymer of perfluoro-2,2-dimethyl-1,3-dioxole (PDD) and polytetrafluoroethylene (TFE) (such as those copolymers available under the trade names TEFLON AF2400 and TEFLON AF1600 from DuPont Company), a copolymer of 2,2,4-trifluoro-5-trifluoromethoxy-1,3-dioxole (TTD) and TFE (such as those copolymers available under the trade names HYFLON AD60 and HYFLON AD80 from Solvay Company), and a copolymer of TFE and cyclic perfluoro-butenylvinyl ether (such as the copolymer available under the trade name CYTOP from Asahi Glass, Japan).

In certain embodiments, such amorphous glassy perfluoropolymer is a perfluoro-dioxole homopolymer or copolymer such as a copolymer of perfluoro-2,2-dimethyl-1,3-dioxole (PDD) and polytetrafluoroethylene (TFE), and a copolymer of 2,2,4-trifluoro-5-trifluoromethoxy-1,3-dioxole (TTD) and TFE.

In certain embodiments, such amorphous glassy perfluoropolymer is deposited out of solution. Exemplary solvents for use in deposition of the amorphous glassy perfluoropolymer include those available from 3M Company under the trade names FLUORINERT FC-87, FC-72, FC-84, and FC-770, as well as NOVEC HFE-7000, HFE-7100, HFE-7200, HFE-7300, and HFE-7500.

Methods of Making Composite Membranes

In certain embodiments, the polymer compositions described herein are typically applied out of a solution or dispersion of the desired (pre-polymerized) PVP-containing or PVL-containing polymer in a suitable amount of a liquid (e.g., deionized water or organic solvents). If an organic solvent is used, it may include methanol, ethanol, propanol, isopropanol, dibutyl sebecate, glycerol triacetate, acetone, methyl ethyl ketone etc.

By careful selection of the concentration of the coating solution or dispersion, the molecular weight and/or particle size of the PVP- or PVL-containing polymer and additives, and the substrate pore structure so that the polymer composition remains substantially on the surface, or penetrates substrate pores, or a combination of both, can be controlled. Subsequent drying, curing (e.g., by UV or electron beam irradiation), crosslinking, or grafting all the applied polymer composition is preferred so that only an insignificant amount is washed out and wasted.

The coating process of a pre-polymerized polymer may be more controllable than a coating process that includes applying a polymerizable composition that is polymerized in situ.

Typically, a polymerizable pore-filling polymer composition (that is polymerized in situ) may be applied to a selected porous substrate by a variety of techniques such as dip coating, gravure coating, die coating, slot coating, etc. In certain situations, subsequent polymerization and removal of unpolymerized pore-filling material may lead to waste and less control over placement of the polymer composition. For example, in a "dip and squeeze" method, the substrate to be coated is run through a pan of coating solution and then excess coating solution squeezed out by running the substrate between a pair of nip rolls. Excess solution is typically applied than is needed to stay on the finished membrane. The excess solution often penetrates to the porous substrate (e.g., macroporous layer of the substrate) where it will not produce any beneficial separation. Excess polymer application can reduce flux. Thus, in certain situations, the intent is to apply just enough polymer to achieve the desired level of selectivity and not so much that flux is significantly reduced. In certain situations, the application of a polymerizable material can increase the cost of production, increase waste, and may be difficult to control the amount and placement of the polymer.

Using a method that applies a pre-polymerized polymer may result in many aspects of the coating process being more readily controlled. This can include, for example: the amount of coating composition applied; the location of the coating composition applied; migration of the coating after being applied (on one surface, both surfaces or penetrating into the substrate); the amount and depth of crosslinking and/or grafting; the amount of coating composition not crosslinked, cured, or grafted to the substrate; the amount of waste. Thus, control of each of these steps by applying a pre-polymerized polymer may have an impact on the consistency of final membrane flux, selectivity, and durability.

Either an ionic liquid could be mixed in the coating composition and applied to the porous support at one pass, or an ionic liquid dissolved in a solvent can be over-coated onto the PVP- or PVL-containing polymer coated membrane. The ionic liquid may diffuse into the PVP- or PVL-containing polymer layer.

An amorphous fluorocarbon film may be applied after the PVP- or PVL-containing polymer composition is coated in or on a substrate. The fluorocarbon film can be formed out of a solution or deposited by plasma fluorination.

Commercially available porous substrates may be supplied with a humectant, such as glycerol, that fills and/or coats the pores of the substrate. Typically, this is done to prevent small pores from collapsing during drying process and storage, for example. This humectant may or may not be washed out before using. Typically, however, the humectant is washed out by the process of filling the pores with the pore-filling coating solution. Preferably, a substrate is obtained and used without a humectant. Commercially available porous substrates also may be supplied as wet with water and/or preservative(s). Preferably, a dry substrate is used.

Uses

Composite membranes, particularly asymmetric composite membranes, of the present disclosure may be used in various separation methods. Such separation methods include pervaporation, vapor permeation, gas separation, nanofiltration, organic solvent nanofiltration, and combinations thereof (e.g., a combination of pervaporation and vapor permeation). The composite membranes, particularly the asymmetric composite membranes, of the present disclosure are particularly useful in pervaporation methods. Pervaporation may be used for desulfurization of gasoline, dehydration of organic solvents, isolation of aroma components, and removal of volatile organic compounds from aqueous solutions.

Preferred methods of the present disclosure involve use of the composite membranes, particularly the asymmetric composite membranes, in pervaporation, particularly pervaporating alcohol from an alcohol and gasoline mixture.

Well-known separation techniques may be used with the composite membranes of the present disclosure. For example, nanofiltration techniques are described in U.S. Pat. Pub. No. 2013/0118983 (Linvingston et al.), U.S. Pat. No. 7,247,370 (Childs et al.), and U.S. Pat. Pub. No. 2002/0161066 (Remigy et al.). Pervaporation techniques are described in U.S. Pat. No. 7,604,746 (Childs et al.) and EP 0811420 (Apostel et al.). Gas separation techniques are described in *Journal of Membrane Sciences*, vol. 186, pages 97-107 (2001).

Pervaporation separation rate is typically not constant during a depletion separation. The pervaporation rate is higher when the feed concentration of the selected material (in this case ethanol) is higher than near then end of the separation when the feed concentration of the selected material is lower and this rate is typically not linear with concentration. At high feed concentration the separation rate is high and the feed concentration of the selected material and flux falls rapidly, but this concentration and flux changes very slowly as the limit of depletion is reached.

Typical conditions used in separation methods of the present disclosure include fuel temperatures of from −20° C. (or from 20° C. or from room temperature) up to and including 120° C. (or up to and including 95° C.), fuel pressures of from 10 pounds per square inch (psi) (69 kPa) up to and including 400 psi (2.76 MPa) (or up to and including 100 psi (690 kPa)), fuel flow rates of 0.1 liter per minute (L/min) up to and including 20 L/min, and vacuum pressures of from 20 Torr (2.67 kPa) up to and including ambient pressure (i.e., 760 Torr (101 kPa)).

The performance of a composite membrane is mainly determined by the properties of the polymer composition disposed in or on the porous (support) membrane.

The efficiency of a pervaporation membrane may be expressed as a function of its selectivity and of its specific flux. The selectivity is normally given as the ratio of the concentration of the better permeating component to the concentration of the poorer permeating component in the permeate, divided by the corresponding concentration ratio in the feed mixture to be separated:

$$\alpha=(y_w/y_i)/(x_w/x_i)$$

wherein $y_w$ and $y_i$ are the content of each component in the permeate, and $x_w$ and $x_i$ are the content of each component in the feed, respectively. Sometimes, the permeate concentration is defined as the separation efficiency if the feed component is relatively consistent.

The trans-membrane flux is a function of the composition of the feed. It is usually given as permeate amount per membrane area and per unit time, e.g., kilogram per meter squared per hour ($kg/m^2/hr$).

In certain embodiments of the present disclosure, the PVP- or PVL-containing polymer composition exhibits an alcohol selectivity in the range of from at least 30% up to and including 100%. In this context, "alcohol selectivity" means the amount of alcohol in the gasoline/alcohol mixture that diffuses through to the output side of the asymmetric composite membrane. In accordance with the present disclosure, the alcohol selectivity of the pore-filling polymer may include, in increments of 1%, any range between 30% and 100%. For example, the alcohol selectivity may be in the range of from 31% up to 99%, or 40% to 100%, or 50% to 95%, etc.

In certain embodiments, the polymer composition in the composite membrane exhibits an average alcohol permeate flux (e.g., from an alcohol/gasoline mixture) in the range of from at least 0.3 $kg/m^2/hr$, and in increments of 10 $g/m^2/hr$, up to and including 30 $kg/m^2/hr$. The average ethanol flux from E 10 (10% ethanol) to E2 (2% ethanol) standard include in the range of from 0.2 $kg/m^2/hr$ to 20 $kg/m^2/hr$. Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) up to and including 760 Torr (101 kPa), a feed pressure of from 10 psi (69 kPa) up to and including 400 psi (2.76 MPa) (or up to and including 100 psi (690 kPa)), and an ethanol concentration in feed gasoline of from 2% up to and including 20%.

In certain embodiments of the present disclosure, the PVP- or PVL-containing polymer composition in the composite membrane can exhibit an average ethanol permeate flux, in increments of 10 $g/m^2/hour$, between the below-listed upper and lower limits (according to Method 1 and/or Method 2 in the Examples Section). In certain embodiments, the average ethanol permeate flux may be at least 310 $g/m^2/hour$, or at least 350 $g/m^2/hour$, or at least 500 $g/m^2/hour$. In certain embodiments, the average ethanol permeate flux may be up to 30 $kg/m^2/hour$, or up to 20 $kg/m^2/hour$, or up to 10 $kg/m^2/hour$. For example, the average ethanol permeate flux may be in the range of from 310 $g/m^2/hour$ up to 20 $kg/m^2/hour$, or 350 $g/m^2/hour$ up to 30 $kg/m^2/hour$, or 500 $g/m^2/hour$ up to 10 $kg/m^2/hour$, etc. It may be desirable for the PVP- or PVL-containing polymer composition to exhibit an average ethanol permeate flux of 320 $g/m^2/hour$, when the asymmetric composite membrane is assembled into 5 liter volume cartridge such that the cartridge will produce the desired amount of flux to meet the system requirements. The system requirements are defined by internal combustion engines that require ethanol flux. One example is a Japan Society of Automotive Engineers technical paper JSAE 20135048 titled "Research Engine System Making Effective Use of Bio-ethanol-blended Fuels."

Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) up to and including 760 Torr (101 kPa), a feed pressure of from 10 psi (69 kPa) up to and including 400 psi (2.76 MPa) (or up to and including 100 psi (690 kPa)), and an ethanol concentration in feed gasoline of from 2% up to and including 20%.

Composite membranes of the present disclosure may be incorporated into cartridges (i.e., modules), in particular cartridges for separating alcohol from an alcohol and gasoline mixture. Suitable cartridges include, for example, spiral-wound modules, plate and frame modules, tubular modules, hollow fiber modules, pleated cartridge, and the like.

Figure 2:
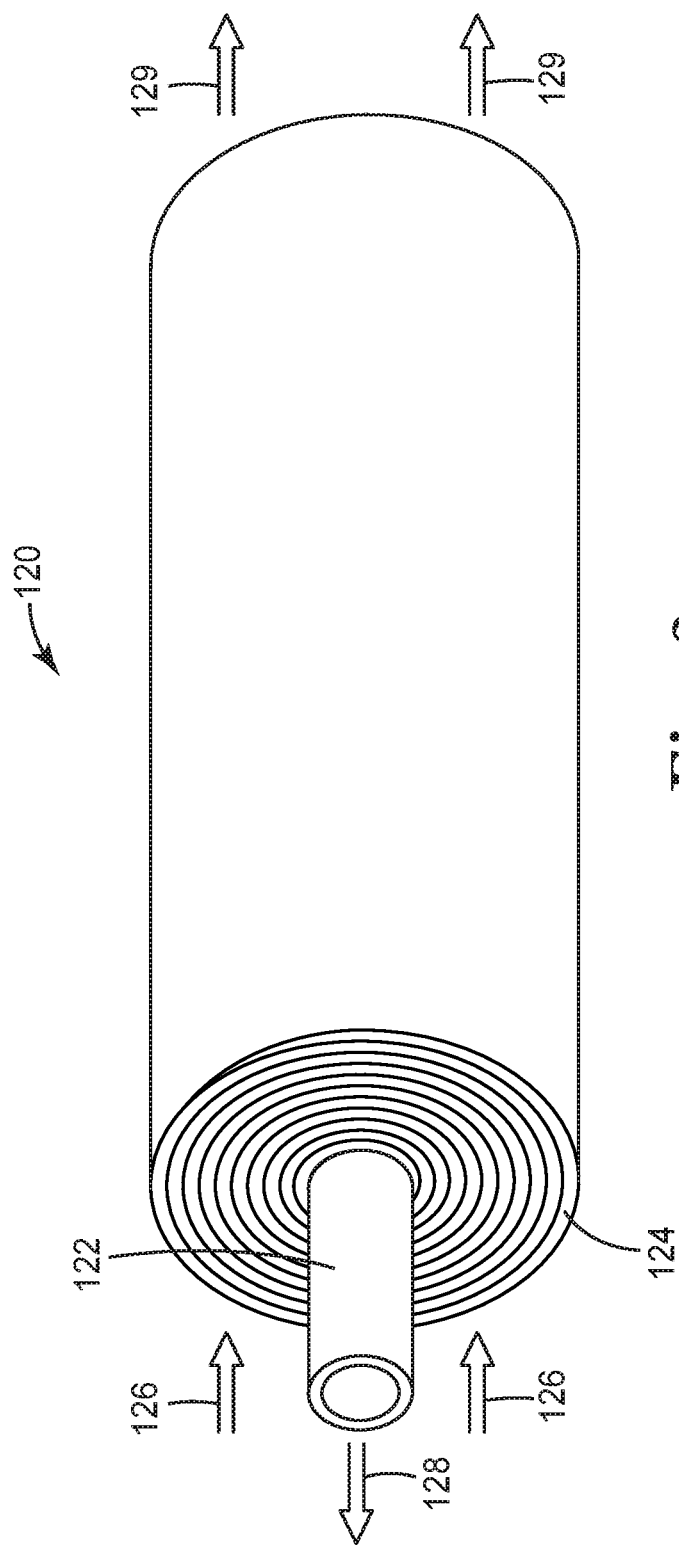
FIG. 2 is a perspective side view of a module that includes an exemplary composite membrane of the present disclosure.

FIG. 2 is an illustration of an exemplary module 120 (specifically, a spiral-wound module) that includes a support tube 122, an exemplary composite membrane 124 of the present disclosure wound onto the support tube 122. During use, a mixture of liquids to be separated (e.g., alcohol and gasoline mixture) enters the module 120 and flows along the direction of arrows 126 into the composite membrane 124. As the mixture flows past the composite membrane layers, the liquid that is less permeable in the pore-filling polymer (e.g., gasoline) is not absorbed by the PVP- or PVL-containing polymer, while the more permeable liquid (e.g., alcohol) is absorbed in and passes through the PVP- or PVL-containing polymer and then flows out of the center of the support tube 122 along the direction of arrow 128. For example, a high concentration of alcohol (typically with a small amount of gasoline), which is separated from an alcohol/gasoline mixture, flows out of the center of the support tube 122 as vapor and/or liquid along the direction of arrow 128, and the resultant mixture with a lower concentration of alcohol than present in the mixture that enters the composite membrane flows out of the composite membrane along the direction of arrows 129.

Figure 3:
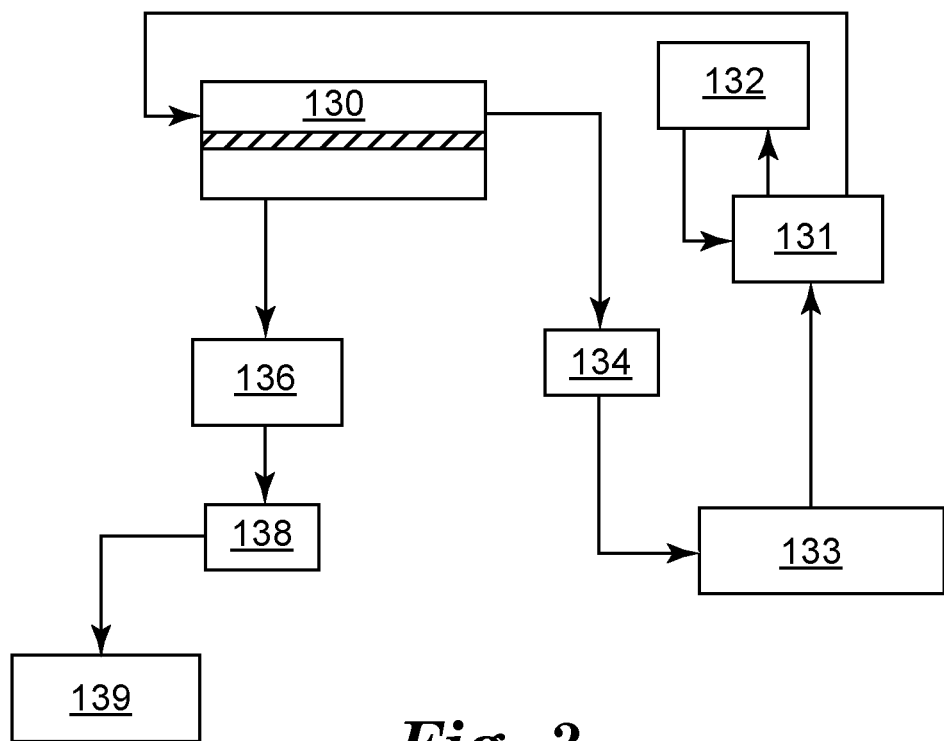
FIG. 3 is an illustration of an exemplary fuel separation system that includes an exemplary composite membrane of the present disclosure.

In certain embodiments, an exemplary cartridge has a volume in the range of from 200 milliliters (mL), or 500 mL, up to and including 5.000 liters (L). In accordance with the present disclosure, the volume of the cartridge may include, in increments of 10 mL, any range between 200 mL, or 500 mL, and 5.000 L. For example, the cartridge volume may be in the range of from 210 mL up to 4.990 L, or 510 mL up to 4.990 L, or 300 mL up to 5.000 L, or 600 mL up to 5.000 L, or 1.000 L up to 3.000 L, etc. In certain embodiments, the cartridge has a volume of 1.000 L. In certain embodiments, the cartridge has a volume of 0.800 L Cartridges that include composite membranes (e.g., asymmetric composite membranes) of the present disclosure may be incorporated into fuel separation systems, which may be used in, or in conjunction with, engines such as flex-fuel engines. An exemplary fuel separation system is shown in FIG. 3, which employs a membrane pervaporation method (PV method) to separate high ethanol fraction gasoline from gasoline containing ethanol. Typically, gasoline is introduced into an inlet of a membrane separation unit 130 after being passed through a heat exchanger 131 (which is connected to engine coolant 132) from a main fuel storage tank 133. A low-ethanol fraction fuel from the membrane separation unit 130 is returned to the main fuel storage tank 133 after being cooled as it passes through a radiator 134. The ethanol rich vapor which came out of membrane separation unit 130 is typically passed through a condenser 136 where it is condensed under negative pressure produced by vacuum pump 138 and then collected in an ethanol tank 139.

In certain embodiments, a fuel separation system includes one or more cartridges, which may be in series or parallel, which include composite membranes of the present disclosure.

EXEMPLARY EMBODIMENTS

Embodiment 1 is a composite membrane for selectively separating (e.g., pervaporating) a first fluid (e.g., first liquid) from a feed mixture comprising the first fluid (e.g., first liquid) and a second fluid (e.g., second liquid), the composite membrane comprising: a porous substrate comprising opposite first and second major surfaces, and a plurality of pores; and a polymer composition, wherein the polymer composition is:

(a) a PVP-containing polymer composition that is not a pore-filling polymer composition;

(b) a PVP-containing polymer composition comprising greater than 75 wt % PVP, wherein the PVP-containing polymer composition is in and/or on the porous substrate;

(c) a PVP-containing polymer composition comprising one or more additional polymers that does not include a polymer derived from one or more ethylenically unsaturated monomers and/or oligomers, wherein the PVP-containing polymer composition is in and/or on the porous substrate; or (d) a PVL-containing polymer composition disposed in and/or on the porous substrate;

wherein the polymer composition forms a polymer layer having a thickness;

wherein the polymer composition is more permeable to the first fluid (e.g., first liquid) than the second fluid (e.g., second liquid).

Embodiment 2 is the composite membrane according to embodiment 1 wherein the polymer composition forms a polymer layer on the first major surface of the porous substrate wherein a majority of the polymer composition is on the surface of the porous substrate.

Embodiment 3 is the composite membrane according to embodiment 1 or 2 wherein one or all of polymer compositions (b), (c), and (d) are pore-filling polymer compositions disposed in at least some of the pores so as to form a layer having a thickness within the porous substrate.

Embodiment 4 is the composite membrane according to embodiment 3 wherein the pore-filling polymer composition is in the form of a pore-filling polymer layer that forms at least a portion of the first major surface of the porous substrate.

Embodiment 5 is the composite membrane according to any one of embodiments 1 through 4 which is asymmetric or symmetric with respect to the amount of polymer composition.

Embodiment 6 is the composite membrane according to embodiment 5 wherein the amount of the polymer composition at, on, or adjacent to the first major surface of the porous substrate is greater than the amount of the polymer composition at, on, or adjacent to the second major surface of the porous substrate.

Embodiment 7 is the composite membrane according to any one of embodiments 3 through 6 wherein the pore-filling polymer composition is in the form of a pore-filling polymer layer having an exposed major surface, which coats the first major surface of the porous substrate, and an opposite major surface disposed between the opposite first and second major surfaces of the porous substrate.

Embodiment 8 is the composite membrane according to embodiment 7 wherein the exposed major surface of the pore-filling polymer layer coats all the first major surface of the porous substrate.

Embodiment 9 is the composite membrane according to any one of embodiments 1 through 8 wherein the first fluid (e.g., first liquid) is an alcohol.

Embodiment 10 is the composite membrane according to any one of embodiments 1 through 9 wherein the second fluid (e.g., second liquid) is gasoline, an aliphatic or aromatic hydrocarbon, or an ether.

Embodiment 11 is the composite membrane according to embodiment 10 wherein the first fluid (e.g., first liquid) is an alcohol, and the second fluid (e.g., second liquid) is gasoline.

Embodiment 12 is the composite membrane according to any one of embodiments 1 through 11 wherein the polymer layer forms a continuous layer.

Embodiment 13 is the composite membrane according to any one of embodiments 1 through 12 wherein the PVP-containing polymer composition or the PVL-containing polymer composition is formed prior to contact with the porous substrate.

Embodiment 14 is the composite membrane according to any one of embodiments 1 through 13 wherein the PVP-containing polymer composition comprises a PVP homopolymer or copolymer.

Embodiment 15 is the composite membrane according to embodiment 14 wherein the PVP-containing copolymer is a PVP-grafted PVA copolymer.

Embodiment 16 is the composite membrane according to any one of embodiments 1 through 13 wherein the PVL-containing polymer composition comprises a PVL homopolymer or copolymer.

Embodiment 17 is the composite membrane according to embodiment 16 wherein the PVL-containing polymer composition comprises polyvinyl-β-propiolactam, polyvinyl-δ-valerolactam, polyvinyl-ε-caprolactam, or a combination thereof.

Embodiment 18 is the composite membrane according to any one of embodiments 1 through 17 wherein the porous substrate is a polymeric porous substrate.

Embodiment 19 is the composite membrane according to any one of embodiments 1 through 17 wherein the porous substrate is a ceramic porous substrate.

Embodiment 20 is the composite membrane according to any one of embodiments 1 through 19 wherein the porous substrate is asymmetric or symmetric.

Embodiment 21 is the composite membrane according to any one of embodiments 1 through 20 wherein the porous substrate comprises a nanoporous layer.

Embodiment 22 is the composite membrane according to embodiment 21 wherein the nanoporous layer is adjacent to or defines the first major surface of the porous substrate.

Embodiment 23 is the composite membrane according to any one of embodiments 1 through 22 wherein the porous substrate comprises a microporous layer.

Embodiment 24 is the composite membrane according to embodiment 23 wherein the microporous layer is adjacent to or defines the second major surface of the porous substrate.

Embodiment 25 is the composite membrane according to any one of embodiments 1 through 24 wherein the porous substrate comprises a macroporous layer.

Embodiment 26 is the composite membrane according to embodiment 25 wherein the macroporous layer is adjacent to or defines the second major surface of the porous substrate.

Embodiment 27 is the composite membrane according to any one of embodiments 1 through 26 wherein the porous substrate has a thickness measured from one to the other of the opposite major surfaces in the range of from 5 µm up to and including 500 µm.

Embodiment 28 is the composite membrane according to embodiment 21 or 22 wherein the nanoporous layer has a thickness in the range of from 0.01 µm up to and including 10 µm.

Embodiment 29 is the composite membrane according to embodiment 23 or 24 wherein the microporous layer has a thickness in the range of from 5 µm up to and including 300 µm.

Embodiment 30 is the composite membrane according to embodiment 25 or 26 wherein the macroporous layer has a thickness in the range of from 25 µm up to and including 500 µm.

Embodiment 31 is the composite membrane according to any one of embodiments 1 through 30 wherein the porous substrate comprises pores having an average size in the range of from 0.5 nanometer (nm) up to and including 1000 µm.

Embodiment 32 is the composite membrane according to any one of embodiments 21, 22, and 28 wherein the nanoporous layer comprises pores having a size in the range of from 0.5 nanometer (nm) up to and including 100 nm.

Embodiment 33 is the composite membrane according to any one of embodiments 23, 24, and 29 wherein the microporous layer comprises pores having a size in the range of from 0.01 µm up to and including 20 µm.

Embodiment 34 is the composite membrane according to any one of embodiments 25, 26, and 30 wherein the macroporous layer comprises pores having a size in the range of from 1 µm up to and including 1000 µm.

Embodiment 35 is the composite membrane according to any one of embodiments 1 through 34 wherein the polymer in the polymer composition is crosslinked, grafted to the porous substrate, or both.

Embodiment 36 is the composite membrane according to any one of embodiments 1 through 35 wherein the polymer in the polymer composition is crosslinked and/or grafted to a nanoporous substrate.

Embodiment 37 is the composite membrane according to any one of embodiments 1 through 36 wherein the PVP-containing polymer composition (c) comprises one or more additional polymers that does not include a polymer derived from one or more (meth)acrylate-containing monomers and/or oligomers.

Embodiment 38 is the composite membrane according to any one of embodiments 1 through 37 wherein the polymer composition swells in the presence of alcohol but not gasoline.

Embodiment 39 is the composite membrane according to any one of embodiments 1 through 38 wherein the polymer layer has a thickness in the range of from 10 nm up to and including 20,000 nm.

Embodiment 40 is the composite membrane according to any one of embodiments 1 through 39 wherein the polymer composition exhibits an alcohol selectivity in the range of from at least 30% up to and including 100%.

Embodiment 41 is the composite membrane according to any one of embodiments 1 through 40 wherein the polymer composition exhibits an average alcohol permeate (e.g., alcohol from an alcohol/gasoline mixture) flux in the range of from at least 310 g/m²/hour up to and including 30 kg/m²/hour, using a feed temperature in the range of from at least 20° C. up to and including 120° C., a permeate vacuum pressure in the range of from at least 20 Torr (2.67 kPa) up to and including 760 Torr (101 kPa), a feed pressure in the range of at least 69 kPa up to and including 2.76 MPa, and an alcohol concentration in feed gasoline/alcohol mixture in the range of from at least 2% up to and including 20%.

Embodiment 42 is a composite membrane according to any one of embodiments 1 through 41 wherein the polymer composition comprises one or more additives selected from a polymeric additive, particulate, and a photoinitiator.

Embodiment 43 is a composite membrane according to any one of embodiments 1 through 42 further comprising at least one of:

(a) an ionic liquid mixed with the polymer composition; or (b) an amorphous fluorochemical film disposed on the composite membrane.

Embodiment 44 is the composite membrane according to embodiment 43 wherein the amorphous fluorochemical film is a plasma-deposited fluorochemical film.

Embodiment 45 is the composite membrane according to embodiment 43 wherein the amorphous fluorochemical film comprises an amorphous glassy perfluoropolymer having a Tg at of least 100° C.

Embodiment 46 is a cartridge for separating alcohol from an alcohol and gasoline mixture, the cartridge comprising a composite membrane according to any one of embodiments 1 through 45.

Embodiment 47 is the cartridge according to embodiment 46 having a volume in the range of from 200 milliliters (mL), or from 500 mL, up to and including 5.000 liters (L).

Embodiment 48 is a fuel separation system comprising one or more cartridges, which may be in series or parallel, according to embodiment 46 or 47.

Embodiment 49 is a method of separating a first liquid from a mixture of the first liquid and a second liquid, the method comprising contacting the mixture with a composite membrane according to any one of embodiments 1 through 45.

Embodiment 50 is the method according to embodiment 49 wherein the first fluid (e.g., first liquid) is an alcohol and the second fluid (e.g., second liquid) is gasoline.

Embodiment 51 is the method according to embodiment 50 which is carried out under the following conditions: a feed temperature in the range of from at least 20° C. up to and including 120° C., a permeate vacuum pressure in the range of from at least 20 Torr (2.67 kPa) up to and including 760 Torr (101 kPa), a feed pressure in the range of at least 69 kPa up to and including 2.76 MPa, and an alcohol concentration in feed gasoline/alcohol mixture in the range of from at least 2% up to and including 20%.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

SR259, PEG200 diacrylate, from Sartomer Company, Exton, Pa.

PA350, polyacrylonitrile substrate, Nanostone Water, formerly known as Sepro Membranes Inc., used as received Photo1173, 2-hydroxy-2-methylpropiophenone, TCI-EP, Tokyo Kogyo Co. Ltd, Tokyo, Japan MPrOH, 1-methoxy-2-propanol, Alfa Aesar, Ward Hill, Mass.

SR344, PEG400 diacrylate, Sartomer Company, Exton, Pa.

SR399, dipentaerythritol pentaacrylate, Sartomer Company, Exton, Pa.

K-90, polyvinylpyrrolidone, PVP, MW 360K, Spectrum Chemical MFG. Corp, Gardena, Calif.

K-12, polyvinylpyrrolidone, PVP, MW3500, Spectrum Chemical MFG. Corp, Gardena, Calif.

HEA, N-Hydroxyethyl acrylamide, Sigma Aldrich, Milwaukee, Wis.

V7154, Pitzcol 7154, polyvinylpyrrolidone (PVP) grafted polyvinyl alcohol (PVA), PVP-g-PVA, (PVP/PVA=50/50), obtained from Daiichi Kogyo Seiyaku, Japan K90, Pitzcol K-90, polyvinylpyrrolidone (PVP), Daiichi Kogyo Seiyaku, Japan TC-310, Orgatix TC-310, Titanium lactate, $Ti(OH)_2[OCH(CH_3)COOH]_2$, obtained from Matsumoto Fine Chemical Co. Ltd., Japan PVA, polyvinylalcohol, MW66K, Wako Pure Chemical, Japan V0078, Pitzcol 0078, PVP-g-PVA (PVP/PVA=80/20), Daiichi Kogyo Seiyaku, Japan Test Procedures Method 1

Figure 4:
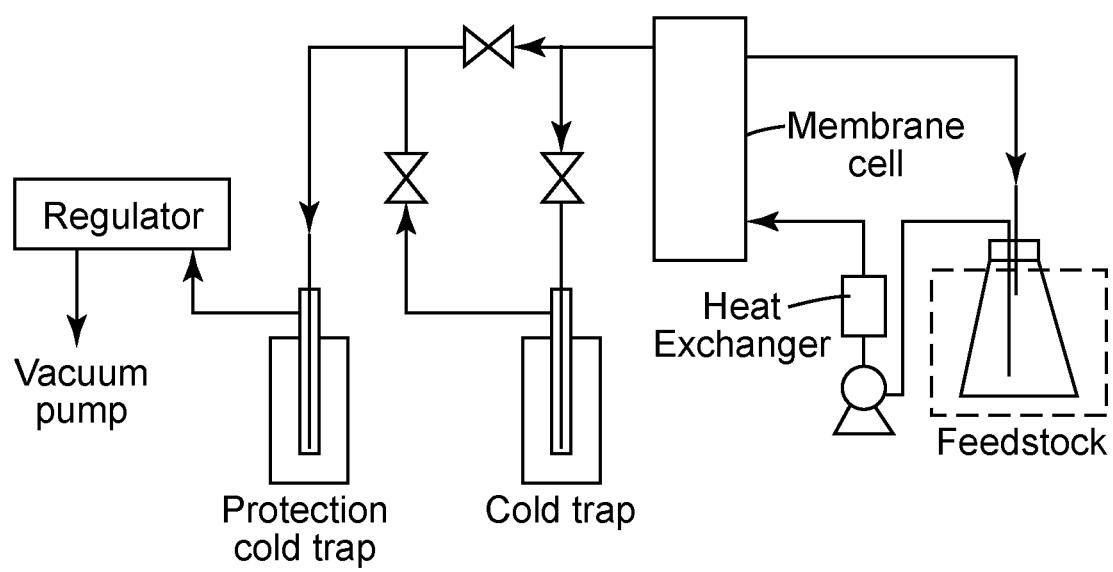
FIG. 4 is an illustration of a vacuum pervaporation testing apparatus.

The ability of the membranes to separate ethanol and gasoline from an ethanol/gasoline mixture was determined using the test apparatus depicted in FIG. 4 and the following technique. The membrane sample was mounted onto a stainless steel cell (Sepa CF II, obtained from General Electric Co., Fairfield, Conn.). The effective membrane surface area was 140 cm². A feedstock of E10 gasoline (10% ethanol) was heated by a heat exchanger and pumped through the membrane cell at a flow rate of 500 ml/min. The input and output temperatures of the feedstock at the inlet and outlet of the membrane cell were measured with thermocouples. The permeate was collected in a cold trap cooled with liquid nitrogen. The membrane cell vacuum was controlled by a regulator connected to a vacuum pump. Testing was performed under the following conditions: 70° C. feedstock temperature and 200 Torr vacuum. The total permeate mass flux was calculated as:

$$\text{Flux} = \frac{m}{A \times t}$$

where m is the mass of the permeate in kilograms (kg); A is the effective membrane area in square meters (m²); and t is the permeate collection duration time in hours (h). The ethanol content of the permeate and the feedstock were measured by gas chromatography (GC) using an Agilent Model 7890C gas chromatograph. The alcohol content was determined by using a calibration line, obtained by running known concentrations of ethanol through the GC and measuring the GC response area. Then the response area measurements of the permeate and feedstock from the GC were obtained and then using the calibration line and the % ethanol was determined. Ethanol mass flux was calculated as membrane mass flux multiplied by the ethanol concentration in the permeate.

The each permeate collection lasted 10 min and five measurements were taken for each membrane. The average data of the last three measurements were used to represent the membrane performance.

Method 2

The ability of the membranes to separate ethanol from an ethanol/gasoline mixture was determined as Method 1 above except the test apparatus was run in a continuous mode after charging the initial test vessel with about 1.1 liters of gasoline. Testing was conducted for 120 min. The flow rate of the feed stream was maintained at 500 mL/min. Vacuum in the membrane permeate side was set at 200 Torr (26.7 kPa) and the average gasoline temperature at the inlet and outlet of the membrane cell was maintained at 70° C. Permeate samples were collected every 5-10 minutes and the feed ethanol contents were monitored every 10 min. The time to reach 2% EtOH content was obtained by extending the trend line of the ethanol depletion curve. The average ethanol flux was calculated as follows $$\text{flux} = m(c_0 - 2\%)/t/A$$

Where m, the initial charged mass of feed gasoline, co is the initial ethanol concentration; t is the time for feed ethanol reaching 2%, and A is the active membrane area of the testing cell. The average permeate ethanol was calculated from all of the permeate collected.

Method 3

Figure 5:
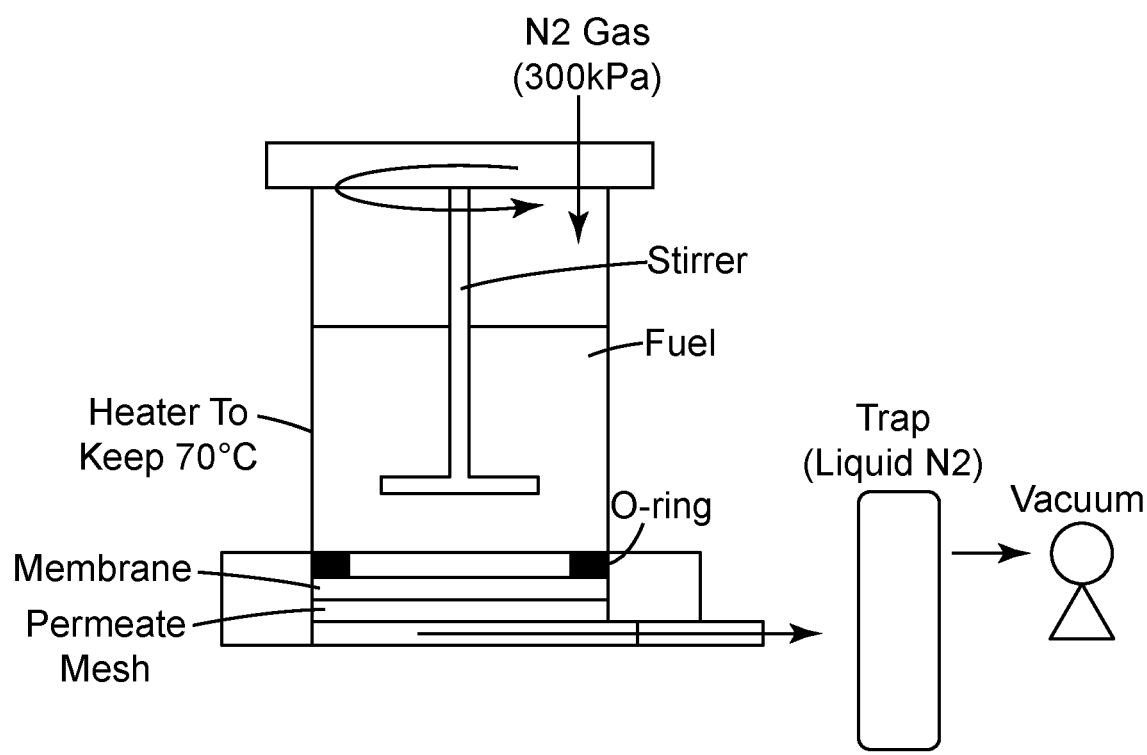
FIG. 5 is an illustration of an alternative vacuum pervaporation testing apparatus.
Figure 6:
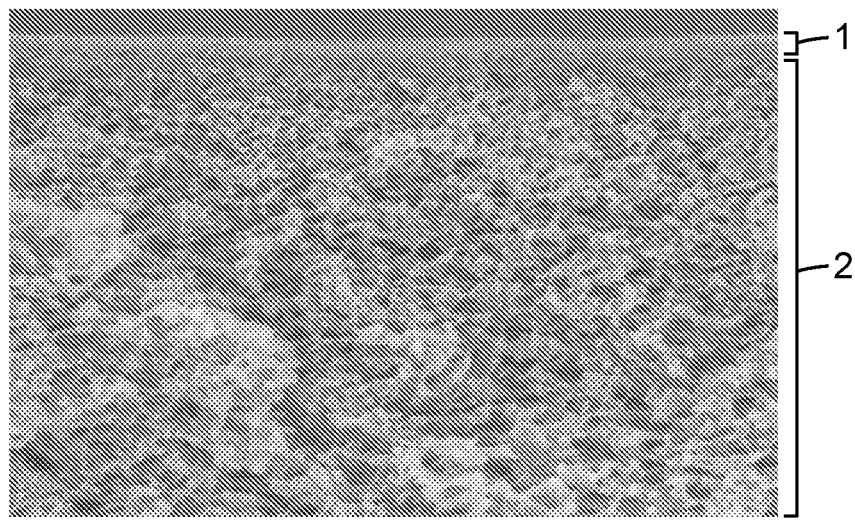
FIG. 6 is an SEM cross-section image (30,000× magnification) of PA350 (polyacrylonitrile) substrate (from Nanostone Water, formerly known as Sepro Membranes Inc. of Oceanside, Calif.) used in Examples 1-44. Layer 1 is a nanoporous layer, layer 2 is a microporous layer (a macroporous layer is not shown). Sample was freeze fractured in liquid nitrogen and imaged using Hitachi S4500 FESEM scanning electron microscope (SEM).

One 76-mm disk of a membrane sample was cut and mounted with a mesh support in a solvent resistant stirred cell (obtained from EMD-Millipore) as shown in FIG. 5. About 100 grams E10 gasoline were charged into the cell. The E10 gasoline (referred to as the feed) was heated up to 70° C. by one infrared lamp. The cell was pressured to 300 kPa by nitrogen to prevent the E10 gasoline from boiling, and 216 Torr vacuum was applied to the permeate side by a diaphragm vacuum pump. The permeate vapor was condensed using a liquid nitrogen trap. Each sample was tested for 45 minutes. Membrane ethanol selectivity was determined by ethanol content in the permeate while the ethanol flux was determined by the end ethanol concentration in the feed gasoline. In other means, a lower end ethanol content implied a higher ethanol flux for a fixed run time of 45 minutes and starting E10 gasoline weight of 100 grams.

Method 4

The membrane sample was soaked into a chamber of an autoclave with the temperature setting of 80° C. After 140 hours exposure time, the pressure was released and the sample was removed and dried out at ambient conditions. The performance of the hot gas exposed membrane was evaluated as in Method 1.

Coating 1

A coating solution was applied onto 203 mm×254 mm PA350 at the nanoporous side using a Mayer rod #7. The coated sample was allowed to dry for about 2 min before UV curing (600 Watts Fusion UV-H bulb with alumina Reflector, line speed at 12.2 m/min).

Coating 2

A slot die was used to apply a coating solution at a predetermined flow rate onto a moving porous substrate (PA350). The coated substrate went through two ovens (3.05 meters long each oven) before UV curing (Fusion UV-H bulb, 300 Watts, with alumina reflector). The substrate line speed was set to 3.05 m/min, the coating width was 203 mm, and the oven temperature set to 200° F.

EXAMPLES

Examples 1-3 Illustrate Membranes Prepared from Solutions without any Polymer Additive Example 1

A coating solution was mixed containing 10 wt % SR259 and 2% photoinitiator, Photo1173 in the solvent MPrOH. With the solution above, a membrane was produced by Coating 1. The membrane showed excessive total flux with no ethanol selectivity Example 2

A membrane was prepared as in Example 1 except that a coating solution containing 10 wt % SR344 and 2% Photo1173 in MPrOH was used. Again, the membrane showed excessive total flux and no ethanol selectivity Example 3

A membrane was prepared as in Example 1 except that a coating solution containing 10 wt % SR399 and 2% Photo1173 in MPrOH by coating 1 was used. The membranes did not show the same excessive total flux as membranes in Examples 1-2, but showed extremely low ethanol selectivity.

Examples 4-14 Illustrate Membranes Prepared from a Solution Containing a Polymer Additive Example 4

A membrane was prepared as in Example 1 except that a coating solution containing 9 wt % SR259, 1 wt % K-90, and 2% Photo1173 in MPrOH was used. The testing results are reported in Table 1 below. The target thickness was calculated from the solid content in the coating solution and the wet thickness a Mayer rod delivered. This membrane showed excellent ethanol flux and selectivity. Membrane durability performance was tested according to method 4 and the results are reported in Table 5 below. After 140 hours exposure to hot gasoline, the performance change was not significant.

Example 5

A coating solution was prepared as described in Example 4 and used to produce a membrane by roll-to-roll processing (Coating 2). Target coating thickness of the composite membrane was 1.0 μm and its testing results are reported in Table 1 below.

Example 6

A membrane was prepared as in Example 5 except that its target coating thickness was 3.0 μm and the testing results are reported in Table 1 below. The membrane was tested by method 2 and the results are reported in Table 2 below.

Example 7

A membrane was prepared as in Example 4 except that 2 wt % PVP with molecular weight 1.3 MM (obtained from Sigma Aldrich, Milwaukee, Wis.) was used and the testing results are reported in Table 1 below. Increasing the PVP content increased the ethanol selectivity but decreased ethanol flux.

Example 8

A membrane was prepared as in Example 4 Except that 2 wt % K-12 was Used and the testing results are reported in Table 1 below. The membrane showed excessive permeate flux and no ethanol selectivity. One possibility is that a very low molecular weight PVP tended to intrude into the pores of PA350 support. As a result, a continuous coating layer was not formed and the membrane may remain porous after coating.

Examples 9-11 Illustrate the Effect of a Photoinitiator or Solvent Residue on Membrane Performance Example 9

A membrane was prepared as in Example 4 except a solution containing 2 wt % K-90, 8% wt % SR259 and 2% Photo1173 in MPrOH was coated and the testing results are reported in Table 1 below.

Example 10

A membrane was prepared as in Example 9 except no photoinitiator was added in the coating solution and the testing results are reported in Table 1 below.

Example 11

A membrane was prepared as in Example 9 by coating 1 except the membrane was dried for 30 min at ambient conditions to further reduce the solvent residue before UV curing. The test results are reported in Table 1 below.

Examples 12-14 Illustrate the Effect of Acrylamide Co-Monomer on Membrane Performance Example 12

A membrane was prepared as in Example 4 except that a solution containing 1 wt % K-90, 9 wt % SR259 and 1.2 wt % HEA, 2% Photo1173 in MPrOH was used and the test results are reported in Table 1 below.

Example 13

A membrane was prepared as in Example 12 except that 2.6 wt % HEA was added in the coating solution and the test results are reported in Table 1 below.

Example 14

A membrane was prepared as in Example 12 except that 6.0 wt % HEA was added in the coating solution and the test results are reported in Table 1 below.

The addition of acrylamide co-monomer showed an increase in ethanol selectivity, but ethanol flux was compromised to some extent.

Examples 15-17 Illustrate Membranes Prepared from Only PVP Polymers

Example 15

A membrane was prepared as in Example 4 except that a solution containing 2 wt % K-90 and 2% Photo1173 in MPrOH (without any other polymerizable monomer) was used with 0.32 µm coating target thickness and the test results are reported in Table 1 below. Membrane durability performance was also tested according to method 4 and the results are reported in Table 5 below. After 140 hours exposure to hot gasoline, performance change was not significant.

Example 16

A membrane was prepared as in Example 15 except that a roll-to-roll processing (Coating 2) was used with 0.2 µm coating target thickness and the test results are reported in Table 1 below.

Example 17

A membrane was prepared as in Example 15 except that there was no UV irradiation after coating and oven drying and the test results are reported in Table 1 below. Surprisingly even with no UV irradiation, PVP composite membranes showed moderate ethanol selectivity and excellent ethanol flux.

Examples 18-23 Illustrate Effect of UV Dosage on Membrane Performance

Example 18-20

Three samples from the membrane prepared in Example 17 was irradiated with 600 watts Fusion UV (H-bulb with Alumina reflector) at the line speed of 12.2 m/min for one pass (Example 18), two passes (Example 19) and three passes (Example 20), respectively. The test results are reported in Table 1 below. With the increasing UV dosage, ethanol selectivity increases while ethanol flux decreases

Examples 21-23

A membrane was prepared as in Example 17 except that the coating thickness was targeted at 1.0 µm. three samples from this membrane were UV irradiated as in Example 18-20 for one pass (Example 21), two passes (Example 22) and three passes (Example 23), respectively. The test results by method 1 are reported in Table 1 below. Increasing the PVP thickness increased ethanol selectivity and had minimal effect on ethanol flux.

Examples 24-28 Illustrate Effect of EB Irradiation on Membrane Performance

Examples 24-28

Samples from the membrane prepared in Example 17 were irradiated with electron beam (EB) at various doses and power levels as shown in Table 3. Under high EB dose and power, the membrane tended to lose ethanol selectivity (Example 25). EB irradiation decreased ethanol flux and ethanol selectivity only slightly increased.

TABLE 1

| Example | Target dry coating thickness (µm) | Total permeate flux (kg/m² · h) | Feed EtOH | Permeate EtOH | EtOH flux (kg/m² · h) |
|---|---|---|---|---|---|
| 1 | 1.6 | >100 | — | 10.4% | — |
| 2 | 1.6 | >100 | — | 11.7% | — |
| 3 | 1.6 | 6.43 | 10.8% | 13.3% | 0.85 |
| 4 | 1.6 | 6.43 | 9.0% | 73.6% | 4.73 |
| 5 | 1.0 | 6.86 | 10.0% | 67.75% | 4.66 |
| 6 | 3.0 | 8.57 | 9.6% | 66.3% | 5.68 |
| 7 | 1.6 | 3.71 | 8.1% | 77.8% | 2.88 |
| 8 | 1.6 | >100 | — | — | — |
| 9 | 1.6 | 10.29 | 8.9% | 59.9% | 6.16 |
| 10 | 1.6 | 13.57 | 7.8% | 50.4% | 6.83 |
| 11 | 1.6 | 14.43 | 8.6% | 46.3% | 6.67 |
| 12 | 1.8 | 2.57 | 9.3% | 94.8% | 2.44 |
| 13 | 2.1 | 2.57 | 9.2% | 100.2% | 2.58 |
| 14 | 2.6 | 1.39 | 10.1% | 97.7% | 1.36 |
| 15 | 0.32 | 9.14 | 8.0% | 60.6% | 5.54 |
| 16 | 0.2 | 8.43 | 8.3% | 60.9% | 5.12 |
| 17 | 0.2 | 14.43 | 8.7% | 48.8% | 7.03 |
| 18 | 0.2 | 10.00 | — | 54.77% | 5.47 |
| 19 | 0.2 | 4.86 | — | 76.72% | 3.70 |
| 20 | 0.2 | 6.00 | — | 73.73% | 4.40 |
| 21 | 1.0 | 8.00 | 8.3% | 59.38% | 4.74 |
| 22 | 1.0 | 7.00 | — | 68.37% | 4.78 |
| 23 | 1.0 | 7.14 | — | 66.97% | 4.78 |

TABLE 2

| Example | Average Permeate EtOH | Average EtOH flux (kg/m² · h) |
|---|---|---|
| 5 | 62.5% | 2.32 |

TABLE 3

| Example | EB Dose (Mrad) | EB power level (keV) | Total permeate flux (kg/m² · h) | Feed EtOH | Permeate EtOH | EtOH flux (kg/m² · h) |
|---|---|---|---|---|---|---|
| 17 | — | — | 14.43 | 8.7% | 48.8% | 7.03 |
| 24 | 5 | 300 | 10.14 | 8.5% | 51.50% | 5.22 |
| 25 | 10 | 300 | >100 | — | — | — |
| 26 | 5 | 200 | 9.00 | 8.0% | 53.50% | 4.81 |
| 27 | 10 | 200 | 12.14 | — | 46.49% | 5.62 |
| 28 | 10 | 110 | 9.71 | 8.4% | 53.87% | 5.23 |

Examples 29-44 Illustrate Membranes Prepared from PVP Copolymer or PVP Polymer Blends

Example 29

A membrane was prepared by coating a 5 wt % PVP-grafted PVA, V7154 in water onto a PA350 sample using a Mayer Rod with target thickness at 0.2 µm. The coated composite membrane was dried in a convection oven at 80° C. for 1 min before performance evaluation in Method 3. The test results are reported in Table 4 below. The membrane ethanol selectivity went up to 72.7%, but after 45 min separation, ethanol content in the feed remained as high as 6.1%. This means the ethanol flux was low.

Example 30

A membrane was prepared as in Example 29 except that 70 mass parts of V7154 and 30 mass parts of K90 (Pitzcol K-90) were used to formulate a 5 wt % coating solution and the target coating thickness was 0.1 µm. The test results are reported in Table 4 below. After adding more PVP components, ethanol flux significantly increased with a much lower end ethanol feed content.

Example 31

A membrane was prepared as in Example 30 except that the target coating thickness was 1.0 µm. The testing results are reported in Table 4 below. Membrane performance appears insensitive to the coating thickness from 0.1 to 1.0 µm.

Example 32

A membrane was prepared as in Example 30 except that the target coating thickness was 0.3 µm. The test results are reported in Table 4 below.

Example 33

A membrane was prepared as in Example 32 except an additional 5.15 mass part of TC-310 was added in the coating solution. The coated membrane was baked in a convection oven (80° C.) for one hour before performance evaluation. Compared to Example 32, addition of TC-310 increased ethanol selectivity but reduced ethanol flux.

Example 34

A membrane was prepared as in Example 29 except that 60 mass parts of V7154 and 40 mass parts of K90 were used to formulate a 5 wt % coating solution and the target coating thickness was 0.3 µm. The test results are reported in Table 4 below.

Example 35

A membrane was prepared as in Example 34 except an additional 4.43 mass part of TC-310 was added in the coating solution. The coated membrane was baked in a convection oven (80° C.) for one hour before performance evaluation. The testing results are reported in Table 4 below.

Example 36

55 mass parts of V7154 and 45 mass parts of K90 were mixed to formulate a 5 wt % coating solution and an additional 4.06 mass parts of TC-310 was added into the coating solution. The solution above was coated onto a PA350 using a Mayer Rod to target a dry coating thickness of 0.3 µm. The coated membrane was dried and baked in a convection oven (80° C.) for one hour before performance evaluation. The test results are reported in Table 4 below.

Example 37

A membrane was prepared as in Example 36 except that the coated membrane was irradiated by UV (600 watts Fusion system with H bulb and alumina reflector, the line speed at 14.4 m/min) for four passes. The UV irradiated membrane was baked in a convection oven (80° C.) for one hour before performance evaluation. The test results are reported in Table 4 below. Compared to the membrane in Example 36, UV irradiation increased ethanol selectivity.

Example 38

A membrane was prepared as in Example 36 except that 70 mass parts of K90 and 30 mass parts of PVA were used to formulate a 5 wt % coating solution and an additional 4.43 mass parts of TC-310 was added into the coating solution. The coated membrane was baked in a convection oven (80° C.) for one hour before performance evaluation. The test results are reported in Table 4 below.

Example 39

A membrane was prepared as in Example 38 except that the coated membrane was irradiated by UV (600 watts Fusion system with H bulb, an alumina reflector, and the line speed at 14.4 m/min) for four passes. The UV irradiated membrane was baked in a convection oven (80° C.) for one hour before performance evaluation. The test results are reported in Table 4 below.

Example 40

A membrane was prepared as in Example 36 except that 91 mass parts of V0078 and 9 mass parts of PVA were used to formulate a 5 wt % coating solution and an additional 4.02 mass parts of TC-310 was added into the coating solution. The coated membrane was baked in a convection oven (80° C.) for one hour before performance evaluation. The test results are reported in Table 4 below.

Example 41

A membrane was prepared as in Example 40 except that the coated membrane was irradiated by UV (600 watts Fusion system with H bulb, an alumina reflector, and the line speed at 14.4 m/min) for four passes. The UV irradiated membrane was baked in a convection oven for one hour (80° C.) before performance evaluation. The test results are reported in Table 4 below.

Example 42

A membrane was prepared as in Example 29 except that 60 mass parts of V7154 and 40 mass parts of K90 were used to formulate a 5 wt % coating solution and the target coating thickness was 0.3 µm. the coated membrane was irradiated by UV (600 watts Fusion system with H bulb, an alumina reflector, and the line speed at 14.4 m/min) for four passes. The test results are reported in Table 4 below.

Example 43

A membrane was prepared as in Example 42 except that an additional 4.38 mass parts of TC-310 was added in the coating solution. The test results are reported in Table 4 below.

Example 44

100 mass parts of V0078 were mixed to formulate a 5 wt % coating solution in water and an additional 2.99 mass parts of TC-310 was added into the coating solution. The solution above was coated onto a PAN350 using a Mayer Rod to target at dry coating thickness of 0.3 μm. The coated membrane was irradiated by UV (600 watts Fusion system with H bulb, an alumina reflector, and the line speed at 14.4 m/min) for four passes. The UV irradiated membrane was baked in a convection oven (80° C.) for one hour before performance. The testing results are reported in Table 4 below.

TABLE 4

| Example | TC-310 wt % | PVP component percentage (%) | UV irradiation | Target coating Thickness (μm) | End EtOH (%) | Permeate EtOH (%) |
|---|---|---|---|---|---|---|
| 29 | 0 | 50.0 | No | 0.2 | 6.1 | 72.7 |
| 30 | 0 | 65.0 | No | 0.1 | 2.6 | 55.2 |
| 31 | 0 | 65.0 | No | 1.0 | 2.8 | 57.7 |
| 32 | 0 | 65.0 | No | 0.3 | 2.4 | 58.9 |
| 33 | 4.9 | 61.8 | No | 0.3 | 4.1 | 70.2 |
| 34 | 0 | 70.0 | No | 0.3 | 2.4 | 58.9 |
| 35 | 4.2 | 67.0 | No | 0.3 | 3.1 | 61.5 |
| 36 | 3.9 | 69.7 | No | 0.3 | 2.3 | 54.5 |
| 37 | 3.9 | 69.7 | Yes | 0.3 | 3.0 | 63.4 |
| 38 | 4.2 | 67.0 | No | 0.3 | 2.4 | 54.7 |
| 39 | 4.2 | 67.0 | Yes | 0.3 | 2.6 | 60.9 |
| 40 | 3.9 | 70.0 | No | 0.3 | 2.3 | 56.8 |
| 41 | 3.9 | 70.0 | Yes | 0.3 | 2.5 | 59.5 |
| 42 | 0 | 70.0 | Yes | 0.3 | 2.3 | 58.1 |
| 43 | 4.2 | 67.0 | Yes | 0.3 | 2.8 | 63.3 |
| 44 | 2.9 | 77.7 | Yes | 0.3 | 1.4 | 32.5 |

TABLE 5

| Example | Soaking temperature (° C.) | Soaking duration (hours) | Total permeate flux (kg/m² · h) | Feed EtOH | Permeate EtOH % | EtOH flux (kg/m² · h) |
|---|---|---|---|---|---|---|
| 4 | — | — | 6.43 | 9.03% | 73.64% | 4.73 |
|  | 70 | 100 | 5.29 | 8.01% | 79.48% | 4.21 |
|  | 80 | 140 | 5.00 | 8.33% | 71.69% | 3.59 |
|  | 80 | 140 | 6.71 | 7.16% | 71.49% | 4.80 |
| 15 | — | — | 9.14 | 7.99% | 60.61% | 5.54 |
|  | 80 | 140 | 8.00 | 8.10% | 64.42% | 5.15 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of separating alcohol from a feed mixture of alcohol and gasoline suitable for use in an internal combustion engine, the method comprising:
    providing a composite membrane comprising:
        a porous substrate comprising opposite first and second major surfaces, and a plurality of pores; and
        a polymer composition, wherein the polymer composition is:
            (a) a PVP-containing polymer composition comprising greater than 75 wt % PVP, wherein the PVP-containing polymer composition is in and/or on the porous substrate and is suitable for pervaporating alcohol from the feed mixture; or
            (b) a PVL-containing polymer composition disposed in and/or on the porous substrate, wherein the PVL-containing polymer composition is suitable for pervaporating alcohol from the feed mixture;
        wherein the polymer composition forms a polymer layer on the first major surface, the polymer layer having a thickness, and the polymer composition is more permeable to alcohol than gasoline; and
    contacting the feed mixture with the composite membrane so as to selectively pervaporate and separate a sufficient amount of alcohol from the feed mixture for use in an internal combustion engine.

2. The method according to claim 1, wherein the composite membrane is an asymmetric composite membrane.

3. The method according to claim 2 wherein the amount of the polymer composition at, on, or adjacent to the first major surface of the porous substrate is greater than the amount of the polymer composition at, on, or adjacent to the second major surface of the porous substrate.

4. The method according to claim 1 wherein the polymer layer is a continuous layer.

5. The method according to claim 1 wherein the PVP-containing polymer composition or the PVL-containing polymer composition is formed prior to contact with the porous substrate.

6. The method according to claim 1 wherein the PVP-containing polymer composition comprises a PVP homopolymer or PVP copolymer.

7. The method according to claim 6 wherein the PVP-containing polymer composition comprises a PVP copolymer.

8. The method according to claim 1 wherein the PVL-containing polymer composition comprises a PVL homopolymer or PVL copolymer.

9. The method according to claim 1 wherein the porous substrate is a polymeric porous substrate.

10. The method according to claim 1 wherein the porous substrate has a thickness measured from one to the other of the opposite major surfaces in the range of from 5 μm up to and including 500 μm.

11. The method according to claim 1 wherein the porous substrate comprises pores having an average size in the range of from 0.5 nanometer (nm) up to and including 1000 μm.

12. The method according to claim 1 wherein the polymer composition is a pore-filling polymer composition in the form of a pore-filling polymer layer that forms at least a portion of the first major surface of the porous substrate.

13. The method according to claim 1 further comprising at least one of:

(a) an ionic liquid mixed with the polymer composition; or
(b) an amorphous fluorochemical film disposed on the composite membrane.

14. The method according to claim 13 wherein the amorphous fluorochemical film is a plasma-deposited fluorochemical film.

15. The method according to claim 13 wherein the amorphous fluorochemical film comprises an amorphous glassy perfluoropolymer having a Tg at of least 100° C.

16. The method according to claim 1 further comprising: providing an internal combustion engine fuel separation system comprising the composite membrane and a storage tank for the feed mixture.

17. The method according to claim 16 wherein the fuel separation system further comprises a cartridge for separating the alcohol from the alcohol and gasoline feed mixture, wherein the cartridge comprises the composite membrane.

18. The method according to claim 16 wherein the composite membrane exhibits an alcohol selectivity in the range of from 31% up to 99%.

19. The method according to claim 18 wherein the composite membrane exhibits an average alcohol permeate flux from the feed mixture in the range of from at least 0.3 kg/m$^2$/hr up to and including 30 kg/m$^2$/hr, when such flux is measured under processing conditions that include a feed temperature in the range of from −20° C. up to and including 95° C., a permeate vacuum pressure in the range of from 20 Torr (2.67 kPa) up to and including 760 Torr (101 kPa), a feed pressure in the range of from 10 psi (69 kPa) up to and including 400 psi (2.76 MPa), and an alcohol concentration in feed mixture of from 2% up to and including 20%.

20. The method according to claim 18 wherein the composite membrane exhibits an average alcohol permeate flux from the feed mixture in the range of at least 500 g/m$^2$/hour up to 30 kg/m$^2$/hour, when such flux is measured under processing conditions that include a feed temperature in the range of from −20° C. up to and including 95° C., a permeate vacuum pressure in the range of from 20 Torr (2.67 kPa) up to and including 760 Torr (101 kPa), a feed pressure in the range of from 10 psi (69 kPa) up to and including 400 psi (2.76 MPa), and an alcohol concentration in feed mixture of from 2% up to and including 20%.

* * * * *